United States Patent
Camenisch et al.

(10) Patent No.: US 12,362,923 B2
(45) Date of Patent: Jul. 15, 2025

(54) VERIFICATION KEY GENERATION IN DISTRIBUTED NETWORKS

(71) Applicant: DFINITY STIFTUNG, Zürich (CH)

(72) Inventors: Jan Camenisch, Thalwil (CH); Manu Drijvers, Zürich (CH); Johan Granström, Kilchberg (CH); Roman Kashitsyn, Pfäffikon (CH); Gregory Neven, Oberrieden (CH); Yvonne-Anne Pignolet, Zurich (CH); Dominic Williams, Palo Alto, CA (US)

(73) Assignee: DFINITY STIFTUNG, Zurich (CH)

(*) Notice: Subject to any disclaimer, the term of this patent is extended or adjusted under 35 U.S.C. 154(b) by 147 days.

(21) Appl. No.: 18/014,108

(22) PCT Filed: Dec. 21, 2020

(86) PCT No.: PCT/EP2020/087410
§ 371 (c)(1),
(2) Date: Dec. 30, 2022

(87) PCT Pub. No.: WO2022/002428
PCT Pub. Date: Jan. 6, 2022

(65) Prior Publication Data
US 2023/0179409 A1    Jun. 8, 2023

Related U.S. Application Data

(60) Provisional application No. 63/046,371, filed on Jun. 30, 2020.

(51) Int. Cl.
*H04L 29/06*    (2006.01)
*H04L 9/08*    (2006.01)
*H04L 9/32*    (2006.01)

(52) U.S. Cl.
CPC .......... *H04L 9/0861* (2013.01); *H04L 9/085* (2013.01); *H04L 9/3247* (2013.01)

(58) Field of Classification Search
CPC ....... H04L 9/0861; H04L 9/085; H04L 63/08; H04L 63/101; H04L 9/3247; H04L 63/20
(Continued)

(56) References Cited

U.S. PATENT DOCUMENTS

| | | | |
|---|---|---|---|
| 9,807,106 B2* | 10/2017 | Daniel | ................. G06Q 20/065 |
| 2020/0412526 A1 | 12/2020 | Jing | |
| 2021/0185091 A1* | 6/2021 | Cage | ................. G06Q 20/3821 |

FOREIGN PATENT DOCUMENTS

| | | |
|---|---|---|
| WO | 2019145790 A1 | 8/2019 |
| WO | 2020057196 A1 | 3/2020 |
| WO | 2020061593 A1 | 3/2020 |

OTHER PUBLICATIONS

"DFINITY Technology Overview Series Consensus System"—ACM @ Timo Hanke May 11, 2018. (Year: 2018).*
(Continued)

*Primary Examiner* — Longbit Chai
(74) *Attorney, Agent, or Firm* — Mannava & Kang, P.C.

(57) ABSTRACT

Embodiments of the invention relate to a computer-implemented method for generating verification keys of a public-key signature scheme in a distributed network. The method comprises performing, by a subset of the nodes of a first subnetwork of nodes, a first distributed key generation protocol, the first distributed key generation protocol being configured to generate jointly a verification key for the first subnetwork and a plurality of corresponding secret key shares for the nodes of the first subnetwork. The method further comprises a step of performing, for a second subnetwork, by a subset of the plurality of nodes of the first subnetwork, a second distributed key generation protocol, the second distributed key generation protocol being con-
(Continued)

figured to generate jointly a verification key of the second subnetwork and a plurality of corresponding secret key shares for the nodes of the second subnetwork. A further step comprises signing, by a subset of the nodes of the first subnetwork, the verification key of the second subnetwork with a permissible subset of the secret key shares of the nodes of the first subnetwork, thereby generating a joint signature on the verification key of the second subnetwork. Further aspects relate to a distributed network, a node of a distributed network and corresponding computer program products.

20 Claims, 13 Drawing Sheets

(58) Field of Classification Search
USPC .......................................................... 713/171
See application file for complete search history.

(56) References Cited

OTHER PUBLICATIONS

Amir Herzberg et al., "Proactive Secret Sharing Or: How to Cope With Perpetual Leakage", CRYPTO '95: Proceedings of the 15th Annual International Cryptology Conference on Advances in Cryptology. London, UK: Springer-Verlag. pp. 339-352. ISBN 978-3-540-60221-7.
David Schultz et al., "MPSS: Mobile Proactive Secret Sharing", ACM Trans. Inf. Syst. Secur. vol. 13, No. 4, Article 34 (Dec. 2010), 32 pages.
Paul Feldman, "A practical scheme for non-interactive verifiable secret sharing". In 28th Annual Symposium on Foundations of Computer Science, pp. 427-437, Los Angeles, California, Oct. 12-14, 1987. IEEE Computer Society Press.
Ran Canetti et al., "UC Non-Interactive, Proactive, Threshold ECDSA", IACR Cryptol. ePrint Arch. 2020: 492 (2020), 55 pages.
Rosario Gennaro et al., "Secure distributed key generation for discrete-log based cryptosystems", In Jacques Stern, editor, Advances in Cryptology—EUROCRYPT'99, vol. 1592 of Lecture Notes in Computer Science, pp. 295-310, Prague, Czech Republic, May 2-6, 1999. Springer, Heidelberg, Germany.
Tal Rabin, "A simplified approach to threshold and proactive RSA", Annual International Cryptology Conference, 1998—Springer, 16 pages.
Torben P. Pedersen, A threshold cryptosystem without a trusted party (extended abstract) (rump session). In Donald W. Davies, editor, Advances in Cryptology—EUROCRYPT'91, vol. 547 of Lecture Notes in Computer Science, pp. 522-526, Brighton, UK, Apr. 8-11, 1991. Springer, Heidelberg, Germany.
Adam Gagol et al., "Aleph: Efficient Atomic Broadcast in Asynchronous Networks with Byzantine Nodes", Aug. 14, 2019, 34 pages.
Alin Tomescu et al., "Towards Scalable Threshold Cryptosystems", 2020 IEEE Symposium on Security and Privacy, pp. 877-893.
Andrei Lihu et al., "A Proof of Useful Work for Artificial Intelligence on the Blockchain", Jan. 25, 2020, 24 pages.
International Search Report and Written Opinion for Application No. PCT/EP2020/087410, mailed Apr. 13, 2021, 10 pages.
Philipp Schindler et al., "ETHDKG: Distributed Key Generation with Ethereum Smart Contracts", Cryptology ePrint Archive, downloaded on Aug. 29, 2019, 14 pages.
Timo Hanke et al., "DFINITY Technology Overview Series, Consensus System", May 11, 2018, 16 pages.
Japanese Patent Office, "translation of Office Action for Japanese Application No. 2023-523329", dated Nov. 20, 1 2024, 7 pages.

* cited by examiner

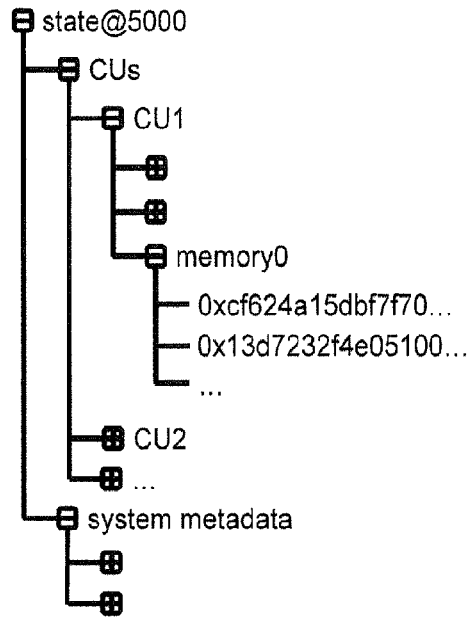
1100    FIG. 11
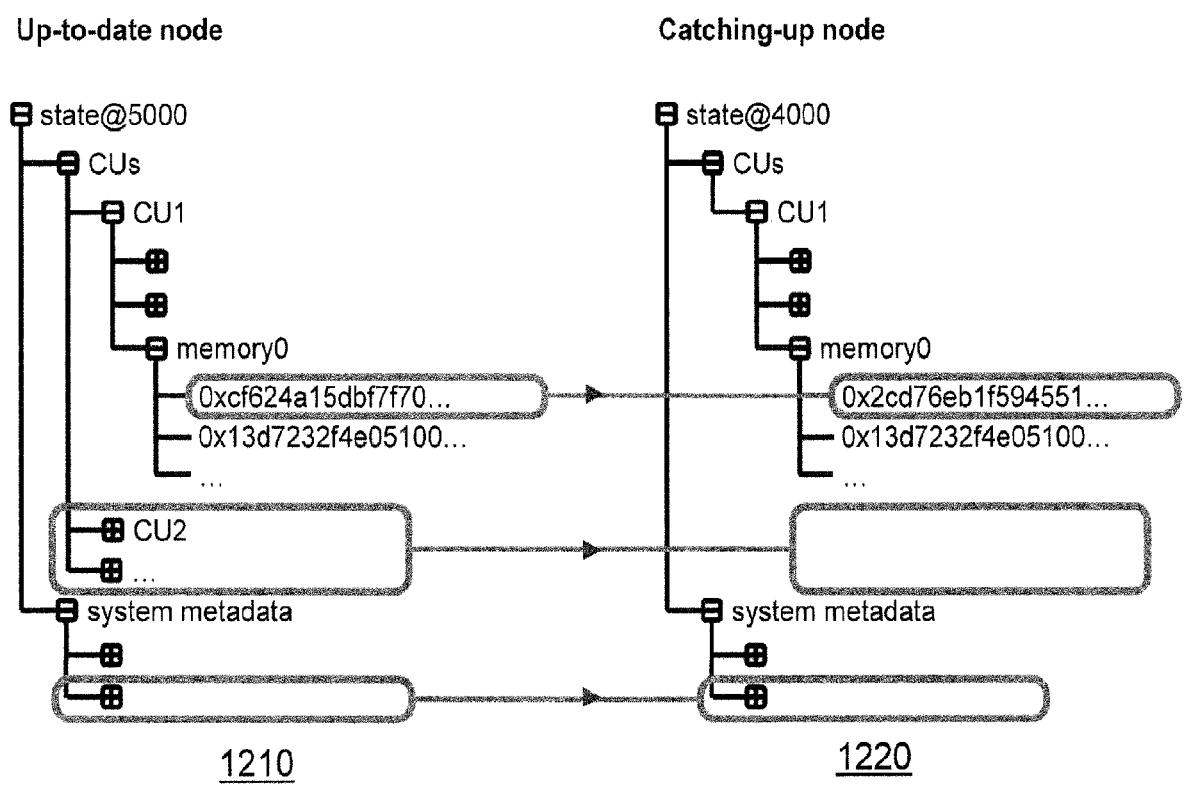
FIG. 12

VERIFICATION KEY GENERATION IN DISTRIBUTED NETWORKS

TECHNICAL FIELD

The present invention pertains to a computer-implemented method for generating verification keys of a public-key signature scheme in distributed networks.

Further aspects relate to a distributed network, a node of a distributed network, a corresponding computer program product and a software architecture encoded on a non-transitory medium.

CLAIM FOR PRIORITY

The present application is a national stage filing under 35 U.S.C 371 of PCT application number PCT/EP2020/087410, having an international filing date of Dec. 21, 2020, which claims priority to U.S. provisional patent application No. 63/046,371 having a filing date of Jun. 30, 2020, the disclosures of which are hereby incorporated by reference in their entireties.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may call small programs known e.g. as smart contracts.

In order for a transaction to be written to the blockchain, it must be "validated" and agreed upon by the network. In other words, the network nodes have to reach consensus on blocks to be written to the blockchain. Such a consensus may be achieved by various consensus protocols.

In one type of blockchain networks, consensus is achieved by using a proof-of-work algorithm. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to validate transactions and to create new blocks.

Another type of consensus protocols is based on a proof-of-stake algorithm. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Consensus protocols used in blockchain networks can be designed to reach fast finality on transactions contained in blocks by applying a "Byzantine fault tolerant" (BFT) agreement protocol. "Synchronous" BFT protocols rely on network synchrony assumptions for safety, while "asynchronous" BFT protocols do not. Asynchronous BFT protocols can typically tolerate less than ⅓ (one third) corrupt participating nodes.

Apart from cryptocurrencies, distributed networks may be used for various other applications.

In particular, they may be used for providing decentralized and distributed computing capabilities and services. To this end, distributed networks may use a state machine replication protocol to reliably run applications and store states across multiple nodes even in the presence of crashing nodes and adversarial attacks.

One challenge of such distributed networks which provide distributed computing services is to provide mechanisms for the generation and distribution of verification keys of a public key signature scheme. Such verification keys are public keys which may be used e.g. for the verification of signatures of the public key signature scheme.

Another challenge of such distributed networks is to provide mechanisms which allow a node that is not up-to-date (anymore) to connect or reconnect to the distributed network. Such a node may be e.g. a node that has crashed and wants to resume its participation in the distributed network or a new node that wants to participate.

DISCLOSURE OF THE INVENTION

Accordingly, one object of an aspect of the invention is to provide a new and advantageous method for the generation and distribution of verification keys in a distributed network.

A further object of further aspect of embodiments of the invention is to provide a method which allows a node of a distributed network that is not up-to-date to connect or reconnect to the distributed network, in particular to connect or reconnect in an efficient and secure manner.

According to an embodiment of a first aspect of the invention there is provided a computer-implemented method for generating verification keys of a public-key signature scheme in a distributed network. The distributed network comprises a plurality of nodes, the plurality of nodes being subdivided into two or more subnetworks, wherein each of the plurality of nodes is configured to run one or more computational units. The computational units are configured to execute computations in a deterministic and replicated manner across the subnetworks of the plurality of nodes, thereby traversing a chain of execution states. The method comprises performing, by a subset of the nodes of a first subnetwork of nodes, a first distributed key generation protocol, the first distributed key generation protocol being configured to generate jointly a verification key for the first subnetwork and a plurality of corresponding secret key shares for a subset of the nodes of the first subnetwork. The method further comprises a step of performing, for a second subnetwork, by a subset of the plurality of nodes of the first subnetwork, a second distributed key generation protocol, the second distributed key generation protocol being configured to generate jointly a verification key of the second subnetwork and a plurality of corresponding secret key shares for a subset of the nodes of the second subnetwork. A further step comprises signing, by a subset of the nodes of the first subnetwork, the verification key of the second subnetwork with a permissible subset of the secret key shares of the nodes of the first subnetwork, thereby generating a joint signature on the verification key of the second subnetwork.

According to such an embodied method the plurality of nodes are subdivided into subsets called subnetworks. All nodes in a single subnetwork traverse the same chain of execution states.

One particular subnetwork, denoted as first subnetwork, is configured to generate the verification keys for its own subnetwork as well as for at least one other subnetwork, denoted as second subnetwork. According to an embodiment, the first subnetwork is configured to generate the verification keys for a plurality of second subnetworks or more generally for all subnetworks of the distributed network. The verification keys of the subnetworks remain constant over time and may hence be also denoted as static verification keys.

According to embodiments the first subnetwork may act as a governance committee to control and change globally necessary protocol configuration, including the assignment of nodes to subnetworks and the key registry.

According to embodiments, the first subnetwork, more particularly a subset of the nodes of the first subnetwork, performs a first distributed key generation protocol. Thereby the first subnetwork generates its own verification key, denoted as first verification key, and corresponding secret key shares for a subset, in particular for all the nodes of the first subnetwork.

When a second subnetwork is created as new subnetwork, the first subnetwork, more particularly, a subset of the nodes of the first subnetwork, performs a second distributed key generation protocol for this new subnetwork, thereby generating a second verification key for the new second subnetwork as well as a plurality of corresponding secret key shares for a subset, in particular for all of the nodes of the second subnetwork.

The method further comprises that a subset of the nodes of the first subnetwork use their secret key shares to sign the public verification key of the second (new) subnetwork, thereby generating a joint signature that acts as a certificate for the verification key of the second network issued by the first subnetwork. This ensures that the verification keys of the second subnetwork(s) can be considered valid. More particularly, each new verification key of a second subnetwork is linked to the verification key that belongs to the first subnetwork. The joint signature is performed with a permissible subset of the secret key shares. The permissible subset may be generally defined as access structure and may depend on the respective security requirements of the distributed network. According to embodiments the joint signature may be a threshold signature and the permissible subset may be defined as a minimum number of secret key shares.

Such a distributed network facilitates an efficient and secure distribution of verification keys of the subnetworks of a distributed network. With the respective verification key of the one or more second subnetworks, all nodes in the distributed network can verify if information has been signed by that second subnetwork. This also holds for the first subnetwork which acts as governance subnetwork. Furthermore, with such an organisation of the subnetworks, the first subnetwork has control over the creation of new subnetworks and it can be avoided that new subnetworks are created in an unauthorized manner. As an additional advantage, the public verification key of the first subnetwork acts as a single root of trust as it allows to verify all of the verification keys of the second subnetworks.

According to an embodiment, the method further comprises signing, by the second subnetwork, a state information package of the second subnetwork with a permissible subset of secret key shares corresponding to the verification key of the second subnetwork, thereby generating a joint signature on the state information package of the second subnetwork, the state information package comprising an execution state or a hash of an execution state of the second subnetwork.

Such an embodied method provides a node that is not up-to-date anymore with a state information package for enabling it to reconnect to the network in an efficient and secure manner. The state information package comprises a recent execution state or a hash of a recent execution state. The joint signature on the state information package can be verified with the respective second verification key.

Each of the plurality of nodes runs one or more computational units. More particularly, each of the nodes in the same subnetwork runs the same set of computational units, wherein the set may comprise one or more computational units. A computational unit may be defined as a piece of software that is running on the network and which has its own unit/execution state. The computational units of the nodes execute computations in a deterministic and replicated manner across the subnetwork and traverse thereby a chain of execution states. In other words, the computational units of the nodes in a subnetwork perform the same computations in a deterministic manner and traverse the same execution states, but different nodes in the subnetwork may be at different positions of the chain of execution states.

According to embodiments, a computational unit may be defined as a deterministic program.

The secret key shares of a subnetwork are held jointly by a subset of the nodes of the subnetwork. The subset may comprise all nodes of the subnetwork, in particular for rather small subnetworks, or only a part of the nodes for large subnetworks. The subset may change over time and the number of nodes of the subset may be dynamically adapted over time.

The verification key of the subnetwork may be stored and provided to all nodes in the system via a registry of the first subnetwork which may act as governance committee. For each of the verification keys a plurality of corresponding secret key shares exist. Each of these secret key shares is only known to a corresponding node of the subset and the respective key shares are kept secret by the respective node of the subset. The term secret key shares shall encompass secret keys according to embodiments.

The verification keys may also be denoted as public keys and the secret key shares as signature key shares or signature keys.

A public-key signature scheme according to embodiments of the invention may comprise e.g. keys of a public-key signature and encryption scheme such as RSA or keys of a public-key signature scheme such as Schnorr or DSA.

The state information package comprises a recent execution state or a hash of a recent execution state of the network. This allows a catch-up node to get up-to-date again and to synchronize its "old" state with the up-to-date state provided by the state information package.

Hence with such a state information package the catch-up node may synchronize its old state to the current state of the network in a kind of fast-forward mode.

The embodiment according to which the state information package comprises only a hash of the execution state has the advantage that the respective node may verify first the hash and only download the complete execution state in case of a positive verification of the hash. This may avoid to download the complete state unnecessarily. In case the verification of the hash is positive, the (complete) execution state itself may be fetched separately.

For ease of illustration/description, in the following the term execution state may also include or refer to a hash of an execution state as appropriate.

According to an embodiment, the method further comprises signing, by the first subnetwork, a state information package of the first subnetwork with a permissible subset of secret key shares corresponding to the verification key of the first subnetwork, thereby generating a joint signature on the state information package of the first subnetwork, the state information package comprising an execution state or a hash of an execution state of the first subnetwork.

Such an embodied method provides a node of the first subnetwork that is not up-to-date anymore with a state information package for enabling it to reconnect to the first subnetwork in an efficient and secure manner. Furthermore, it may allow a node of a second subnetwork to verify a state information package of the first subnetwork. The joint signature on the state information package can be verified with the respective first verification key.

According to an embodiment, the distributed network comprises a plurality of second subnetworks. According to a further embodiment, the state information package of the first subnetwork comprises a list of the second subnetworks, the corresponding node verification keys of the plurality of second subnetworks and the plurality of nodes of the second subnetworks.

This allows a node that has lost its state more or less completely to find out to which subnetwork it belongs. In particular it allows nodes that do not know to which of the second subnetworks they belong to find this out. More particularly, at first the node can verify the state information package of the first subnetwork with the first verification key. From this verified state information package of the first subnetwork the node can see to which second subnetwork it belongs and request from this subnetwork another state information package to reconnect to the respective second subnetwork.

According to an embodiment, the performing of the second distributed key generation protocol for the second subnetwork comprises generating, by the nodes of the first subnetwork, the second verification key and a first set of secret key shares corresponding to the second verification key for the nodes of the first subnetwork, wherein each node of the first subnetwork holds one secret key share of the first set of secret key shares.

In addition, the method comprises a further step of redistributing, by a secret-redistribution protocol, the secret key shares of the first set of secret key shares to the nodes of the second subnetwork, thereby creating a second set of secret key shares corresponding to the second verification key of the second subnetwork.

Hence the second distributed key generation protocol may be performed in two stages or in other words may encompass two stages. At first, the nodes or a subset of the nodes of the first subnetwork generate the verification key of the second subnetwork and a plurality of corresponding secret key shares. This first set of secret key shares is held by a subset of the nodes of the first subnetwork. Then the nodes of the first subnetwork redistribute these shares to the nodes of the second subnetwork. Such a redistribution of the shares may also be denoted as a resharing of shares. The resharing of the shares may be in particular performed by sharing shares of the shares of the first set of shares to the nodes of the second subnetwork.

More particularly, according to an embodiment, the redistribution may comprise generating, by the subset of the nodes of the first subnetwork, shares of the secret key shares of the first set of secret key shares corresponding to the second verification key. Then, the redistribution may comprise communicating or in other words re-sharing the shares of the secret key shares to the nodes of the second subnetwork. Finally, a step of computing, by the nodes of the second subnetwork, their individual secret key shares from the shares of the secret key shares may be performed. In other words, the nodes of the second subnetwork reconstruct their secret key shares of the second set from the received shares of the shares of the first set.

According to embodiments of the invention the nodes of the first subnetwork act as dealers in the second distributed key generation protocol and the nodes of the second subnetwork as receivers of the secret key shares.

According to an embodiment, the method further comprises publishing a newly generated second verification key for a new second subnetwork together with the joint signature of the first subnetwork which acts as governance committee. This provides a certificate for the verification key of the second subnetwork.

Such a certificate allows the verification of the new second verification key.

The publishing of the new verification key may be performed in various ways and the respective way may depend in particular on the messaging and communication channels of the respective distributed network.

In this respect the term publishing shall generally refer to any kind of mechanism that makes the new second verification key available for nodes that want to connect or reconnect to the distributed network.

According to an embodiment, the method further comprises verifying, by a node, in particular by a catch-up node that wants to connect or reconnect to one of the second subnetworks, the state information package of the second subnetwork. The verification of the state information package comprises two sub-steps.

A first sub-step comprises verifying the verification key of the second subnetwork corresponding to the joint signature of the state information package by verifying the certificate with the verification key of the first subnetwork. By this the corresponding node gets a verification key of the second subnetwork that it can trust. In a further sub-step the node may verify the joint signature on the state information package with the verified verification key of the second subnetwork which corresponds to the joint signature of the state information package.

As a result, the node gets a state information package including a recent execution state that it can trust.

According to an embodiment, the method comprises a step of generating, by the distributed network, a blockchain of blocks. Each block corresponds to an execution state of the chain of execution states.

Accordingly, methods of embodiments of the invention may be advantageously applied to distributed networks which utilize a blockchain of blocks. The blocks may be in particular input blocks which are to be processed by the computational units of the nodes. The input blocks may comprise in particular execution messages which shall be executed by the computational units of the nodes. The execution state of a node corresponds to the result of the execution of the execution messages of the corresponding block.

According to an embodiment, the state information package comprises block verification information for verifying subsequent blocks of the blockchain, in particular the validity of subsequent blocks.

The state information package establishes a kind of snapshot of the execution state of the chain of execution states at a certain point in time and may be only provided at every i-th block, e.g. at every 500-th block. If e.g. a catch-up node wants to reconnect to the network while the network is e.g. already at an execution state 600, it can only get the state information package of the execution state 500.

Hence in order to catch-up completely to the execution state 600, the respective node needs to execute and verify the subsequent blocks 501 to 600 itself with the help of the block verification information. The block verification information may comprise in particular a set of verification keys which are required to verify the validity of blocks of the blockchain, in particular the blocks subsequent to the execution state of the state information package.

According to an embodiment, the state information package comprises key generation information of the distributed key generation protocol that was used to generate the verification key of the second subnetwork.

Such key generation information may comprise in particular the complete set of information that is needed for a catch-up node to resume its participation in the distributed key generation protocol. The respective information that is needed for resuming participation in the distributed key generation depends on the respective distributed key generation protocol. According to one embodiment, the key generation information may encompass a complete transcript of the distributed key generation protocol. According to another embodiment, it may comprise a summary of the distributed key generation protocol which comprises a condensed version of the information that allows to extract the catch-up node's secret key share so that it can participate again in the distributed key generation protocol and joint signature generations. Such provisioning of the key generation information further facilitates an efficient resuming of nodes. More particularly, it facilitates that a resuming node is not only able to update its execution state, but it also facilitates that it can participate again in the signature execution.

According to an embodiment, the state information package comprises the complete certificate.

This allows a catch-up node to verify the joint signature of the catch-up package in an efficient manner.

Generally speaking, the state information package comprises according to embodiments of the invention a complete set of information which allows to synchronize the execution state of a catch-up node that wants to connect or reconnect to the distributed network with an execution state of the current interval. The specific information of a respective set may depend on the technical implementation of the respective network.

According to an embodiment, the method comprises a further step of adding the state information package to one of the blocks of the predefined intervals, in particular to the first block of the predefined intervals.

This facilitates an efficient implementation of the method as well as an easy access to the state information package for catch-up-nodes.

According to an embodiment, the state information package provides the execution state as a Merkle-tree structure, in particular as a hash root of the Merkle-tree structure. This allows a memory efficient storage.

According to an embodiment, the method comprises further steps of requesting, by a catch-up node that wants to connect or reconnect to the distributed network from an up-to-date node, leaf hashes of the Merkle-tree structure, comparing, by the catch-up node, the leaf hashes of its own state with the leaf hashes of the up-to-date node and requesting, by the catch-up node from the up-to-date node, only the state information corresponding to leaves with different leaf hashes.

This further facilitates a quick and efficient state synchronization.

According to an embodiment, the distributed key generation protocol is a distributed threshold key generation protocol. According to other embodiments, the distributed key generation protocol is a multi-signature protocol or an aggregated signature protocol. The different distributed key generation protocols have in common that two or more nodes are needed to generate a valid key.

Such an embodiment further facilitates the catch-up of a node. Usually a node only accepts communication from known nodes. Such known nodes encompass in particular trusted nodes. These may be in particular nodes of e.g. the same subnetwork and nodes which are assigned to a respective node for communication according to the communication scheme or communication protocol of the distributed network. Enlarging the set of nodes with whom a catch-up node may communicate may help the catch-up node to catch-up quicker.

According to an embodiment of another aspect of the invention, a distributed network is provided.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspect of the invention.

According to an embodiment of another aspect of the invention, a software architecture encoded on a non-transitory computer readable medium is provided. The software architecture is configured to operate one or more nodes of a distributed network. The encoded software architecture comprises program instructions executable by one or more of the plurality of nodes to cause the one or more of the plurality of nodes to perform a method comprising steps of the method aspects of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein:

FIG. 8b shows a more detailed flow chart of some steps of the method of FIG. 8a;

FIG. 11 shows an example of execution state information of an execution state;

FIG. 12 illustrates a synchronization between an up-to-date node and an outdated catch-up node;

MODES FOR CARRYING OUT THE INVENTION

Figure 1:
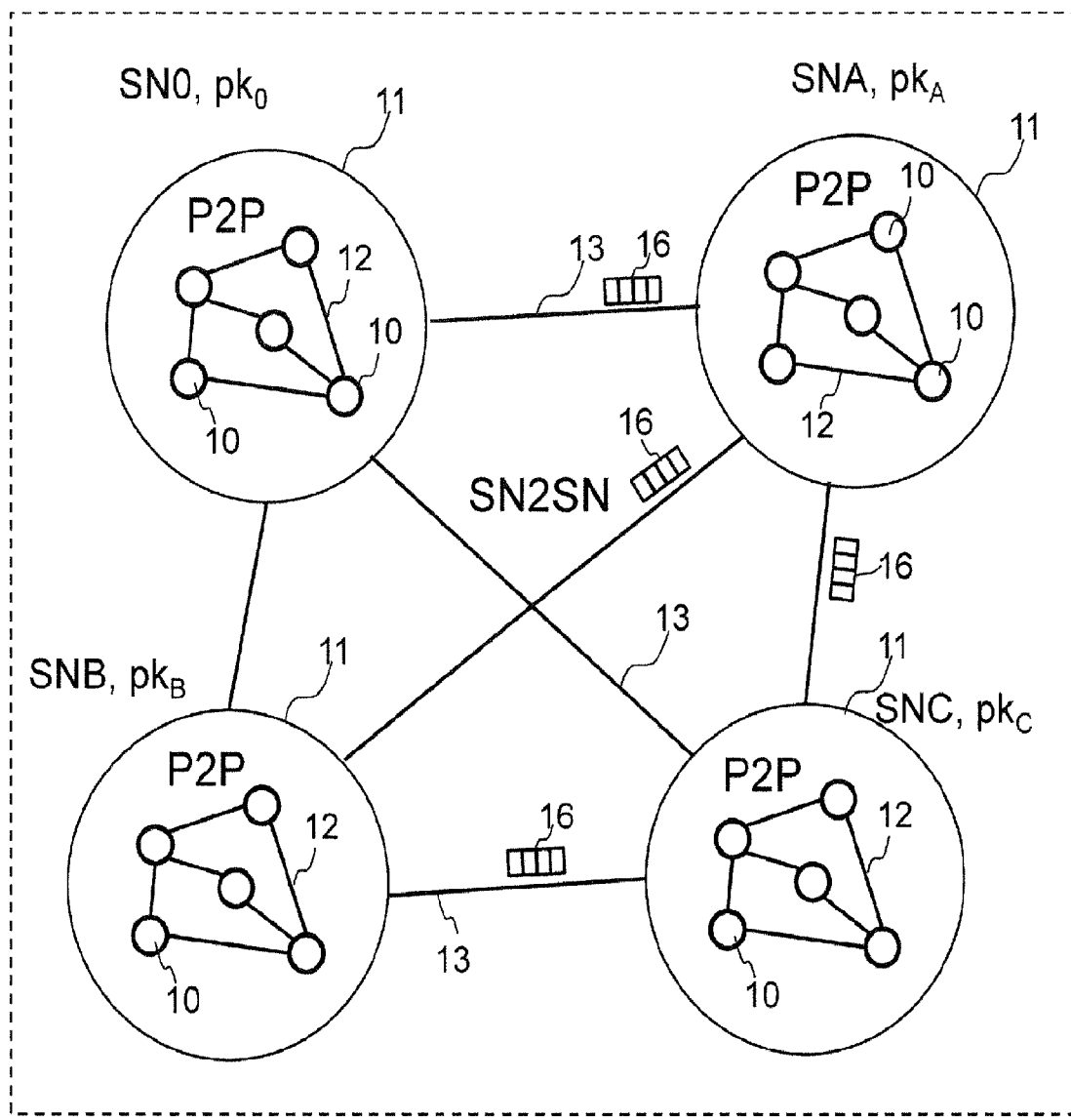
FIG. 1 shows an exemplary diagram of a distributed network according to an embodiment of the invention.

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

A verification key: a bit-string of a public key signature scheme intended to be widely publicized. A verification key may also be denoted as public key and may be used e.g. for the verification of digital signatures of the public key signature scheme.

A public-key signature scheme according to embodiments of the invention may comprise e.g. keys of a public-key signature and encryption scheme such as RSA or keys of a public-key signature scheme such as Schnorr or DSA.

Secret key (sk): a bit-string related to a public key, in particular a verification key, enabling some cryptographic operation, in particular digitally signing a message.

Distributed key generation (DKG): a protocol enabling a set of dealers to create a public key, in particular a verification key, and provide a set of receivers with a secret key share of the corresponding secret key.

Secret redistribution protocol: A secret redistribution protocol may also be denoted as a secret resharing protocol. A protocol to update the secret key shares of a secret key. According to some embodiments the protocol may provide the new or updated secret key shares to the former holders of the secret key shares. According to other embodiments, the protocol may provide the new or updated secret kay shares to a new, in particular a different set of receivers.

Verifiable secret sharing (VSS): a protocol enabling a single dealer to generate a random secret s, a threshold secret sharing s1, ..., sn to the set of receivers, and evidence each receiver can use to verify its share si is correct According to embodiments, the Feldman protocol [Fe187], joint Feldman protocol [Ped91] and the GJKR protocol [GJKR99] may be used as distributed key generation protocols. These protocols are e.g. published as follows and their corresponding disclosure is herewith incorporated by reference:

[Fe187] Paul Feldman. A practical scheme for non-interactive verifiable secret sharing.

In 28th Annual Symposium on Foundations of Computer Science, pages 427-437, Los Angeles, California, Oct. 12-14, 1987. IEEE Computer Society Press.

[Ped91] Torben P. Pedersen. A threshold cryptosystem without a trusted party (extended abstract) (rump session). In Donald W. Davies, editor, Advances in Cryptology—EUROCRYPT'91, volume 547 of Lecture Notes in Computer Science, pages 522-526, Brighton, UK, Apr. 8-11, 1991. Springer, Heidelberg, Germany.

[GJKR99] Rosario Gennaro, Stanislaw Jarecki, Hugo Krawczyk, and Tal Rabin. Secure distributed key generation for discrete-log based cryptosystems. In Jacques Stern, editor, Advances in Cryptology—EUROCRYPT'99, volume 1592 of Lecture Notes in Computer Science, pages 295-310, Prague, Czech Republic, May 2-6, 1999. Springer, Heidelberg, Germany.

The following protocols may be used e.g. according to embodiments of the invention as secret redistribution protocols:

Herzberg, Amir; Jarecki, Stanislaw; Hugo, Krawczyk; Yung, Moti (1995). Proactive Secret Sharing Or: How to Cope With Perpetual Leakage. CRYPTO '95: Proceedings of the 15th Annual International Cryptology Conference on Advances in Cryptology. London, UK: Springer-Verlag. pp. 339-352. ISBN 978-3-540-60221-7.

Ran Canetti, Nikolaos Makriyannis, Udi Peled:

UC Non-Interactive, Proactive, Threshold ECDSA. IACR Cryptol. ePrint Arch. 2020: 492 (2020).

David A. Schultz, Barbara Liskov, Moses D. Liskov: MPSS: Mobile Proactive Secret Sharing. ACM Trans. Inf. Syst. Secur. 13(4): 34:1-34:32 (2010).

FIG. 1 shows an exemplary block diagram of a distributed network 100 according to an embodiment of the invention.

The distributed network 100 comprises a plurality of nodes 10, which may also be denoted as network nodes 10. The plurality of nodes 10 are distributed over a plurality of subnetworks 11. The plurality of subnetworks 11 may in the following also be denoted as subnets 11. In the example of FIG. 1, four subnets 11 denoted with SN0, SNA, SNB and SNC are provided. The subnet 11 establishes a first subnet and may also be denoted as governance subnet. The subnets SNA, SNB and SNC may commonly referred to as second subnets.

Each of the plurality of subnets 11 is configured to run a set of computational units on each node 10 of the respective subnet 11. According to embodiments a computational unit shall be understood as a piece of software, in particular as a piece of software that comprises or has its own unit state. The unit state may also be denoted as execution state.

The network 100 comprises communication links 12 for intra-subnet communication within the respective subnet 11, in particular for intra-subnet unit-to-unit messages to be exchanged between computational units assigned to the same subnet.

Furthermore, the network 100 comprises communication links 13 for inter-subnet communication between different ones of the subnets 11, in particular for inter-subnet unit-to-unit messages to be exchanged between computational units assigned to different subnets.

Accordingly, the communication links 12 may also be denoted as intra-subnet or Peer-to-Peer (P2P) commu-nications links and the communication links 13 may also be denoted as inter-subnet or Subnet-to-Subnet (SN2SN) commu-nications links.

According to embodiments, the distributed network may be in particular configured to exchange inter-subnet messages 16 between the subnets SNA, SNB, SNC and SND via a messaging protocol.

According to embodiments, a unit state or execution state shall be understood as all the data or information that is used by the computational unit, in particular the data that the computational unit stores in variables, but also data the computational units get from remote calls. The unit state/execution state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

According to embodiments of the invention the subnets 11 are configured to replicate the set of computational units across the respective subnet 11. More particularly, the subnets 11 are configured to replicate the unit state/execution state of the computational units across the respective subnet 11.

Each of the subnets 11 holds an individual or in other words separate verification key of a public-key signature scheme. In this example the subnet SN0 holds a verification key $pk_0$, the subnet SNA holds a verification key $pk_A$, the subnet SNB holds a verification key $pk_B$ and the subnet SNC holds a verification key $pk_C$. A verification key may be in the following generally referred to as $pk_X$, wherein X denotes a corresponding subnet. According to embodiments the verification keys $pk_X$ are constant or in other words fixed over the whole lifetime of the respective subnet 11. Hence the verification keys $pk_X$ may also be denoted as static verification keys or constant verification keys.

According to embodiments of the invention the static verification keys $pk_X$ are generated by a distributed key generation protocol performed by the first subnetwork SN0. More particularly, the first subnetwork $SN_0$ generates its own verification key $pk_0$ as well as the verification keys $pk_A$, $pk_B$ and $pk_C$ for the subnetworks SNA, SNB and SNC. Accordingly, the first subnetwork SN0 forms a governance subnetwork.

Figure 8A:
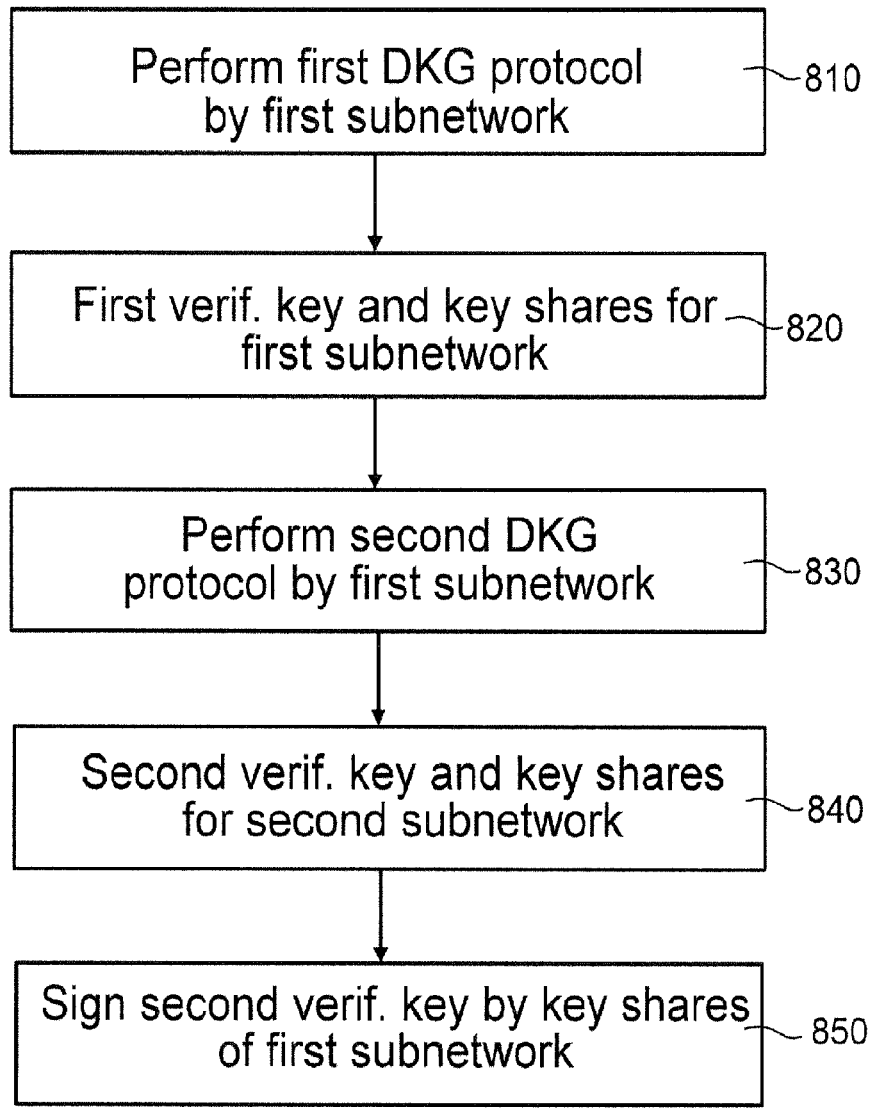
FIG. 8a shows a high-level flow chart of method steps of a computer-implemented method for generating verification keys of a public-key signature scheme according to embodiments of the invention.
Figure 8B:
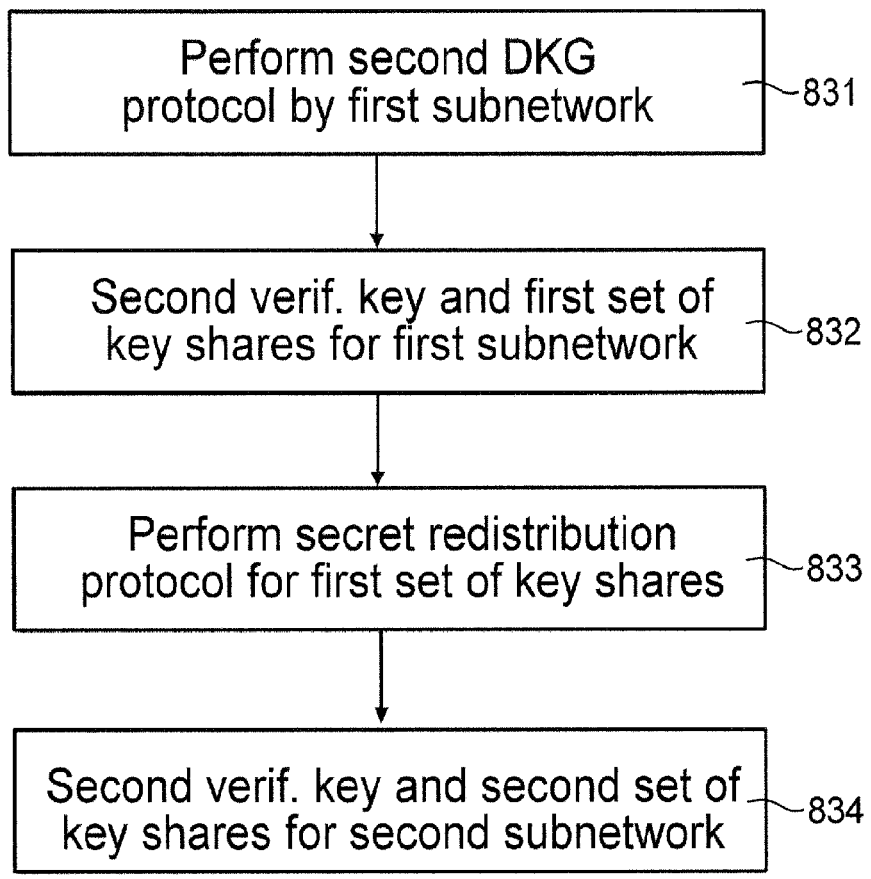
Figure 8C:
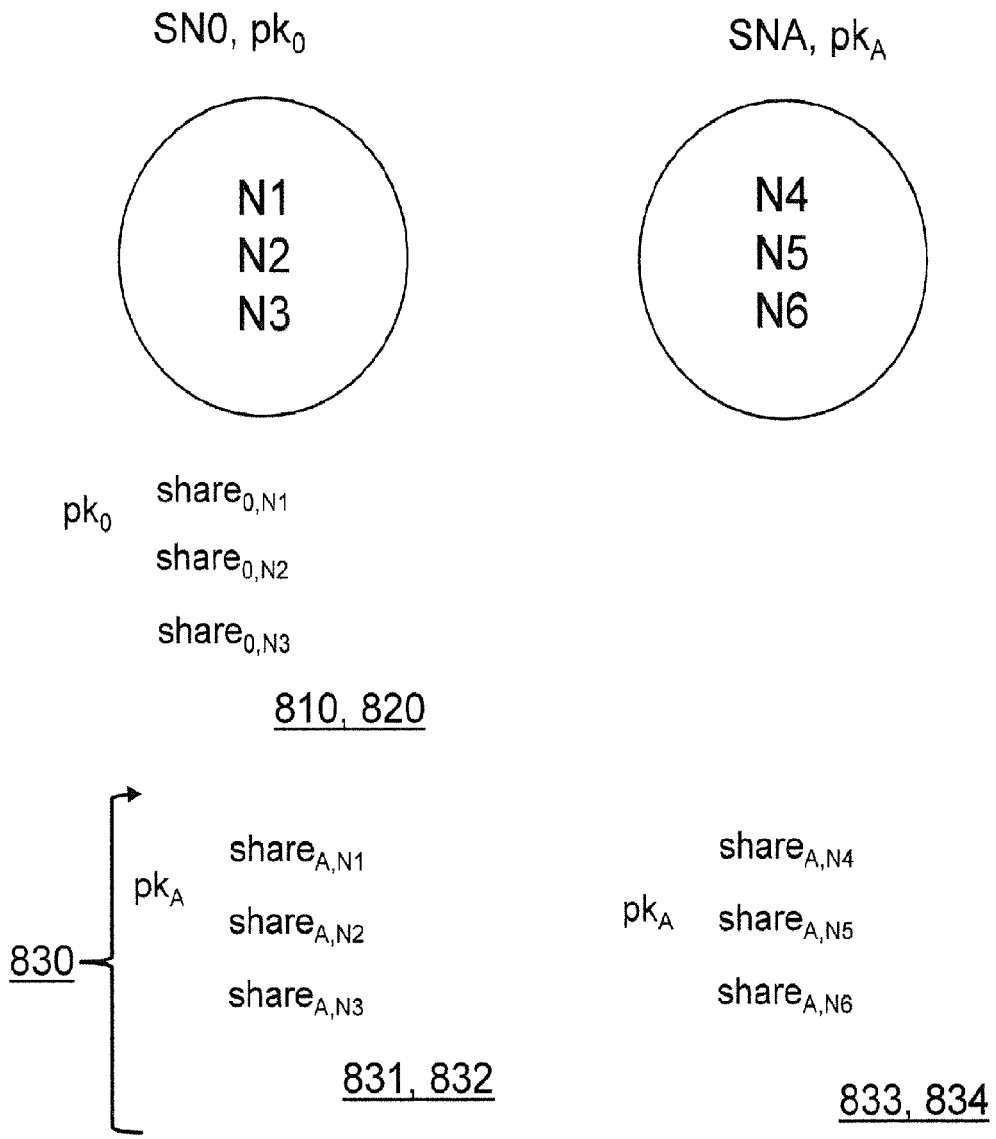
FIG. 8c shows corresponding key material generated by the method steps illustrated in FIGS. 8a and 8b.

Referring now to FIGS. 8a, 8b and 8c, the generation of the verification keys by the first subnetwork SN0 is explained in more detail. The method steps may be performed e.g. by the distributed network 100 as shown in FIG. 1 and are illustrated with reference to the subnet structure shown in FIG. 1.

FIG. 8a shows a high-level flow chart of method steps of a computer-implemented method for generating verification keys of a public-key signature scheme according to embodiments of the invention.

FIG. 8b shows a more detailed flow chart of some steps of the method of FIG. 8a and FIG. 8c shows corresponding key material generated by the method steps.

For the following exemplary and simplified explanation it is assumed that the subnetwork SN0 operates as first subnetwork or in other words governance subnetwork and comprises 3 nodes N1, N2 and N3 and the subnetwork SNA operates as exemplary second subnetwork and comprises 3 nodes N4, N5 and N6 as shown in FIG. 8c.

At a step 810, a subset of the nodes 10 of the first subnetwork SN0 of nodes, e.g. the subset comprising all the nodes N1, N2 and N3, performs a first distributed key generation protocol. More particularly, the nodes of the subset generate jointly as first verification key a verification key $pk_0$ for the first subnetwork SN0 and a plurality of corresponding secret key shares $share_{0,N1}$, $share_{0,N2}$ and $share_{0,N3}$ for the nodes N1, N2 and N3 of the first subnetwork respectively. The result of the first DKG protocol is shown in the box 820.

At a step 830, the nodes 10 of the first subnetwork SN0 of nodes perform, for the second subnetwork SNA, a second distributed key generation protocol. As a result, as shown in the box 840, the nodes N4, N5 and N6 hold secret key shares $share_{A,N4}$, $share_{A,N5}$ and $share_{A,N6}$ which correspond to the verification key $pk_A$.

Referring now to FIG. 8b, the step 830 is illustrated in more detail.

More particularly, at a step 831, the nodes of the subset of the first subnetwork, i.e. the nodes N1, N2 and N3, generate jointly as second verification key a verification key $pk_A$ for the second subnetwork SNA and a plurality of corresponding secret key shares $share_{A,N1}$, $share_{A,N2}$ and $share_{AN3}$ SNA for the nodes N1, N2 and N3 of the first subnetwork. In other words initially the nodes N1, N2 and N3 of the first subnetwork SN0 hold the secret key shares $share_{A,N1}$, $share_{A,N2}$ and $share_{A,N3}$ which correspond to the verification key $pk_A$. The result of this step is shown in the box 832.

Then, at a step 833, the nodes N1, N2 and N3 of the first subnetwork SN0 perform a secret-redistribution protocol and redistribute or in other words re-share their secret key shares $share_{A,N1}$, $share_{A,N2}$ and $share_{A,N3}$ to the nodes N4, N5 and N6 of the second subnetwork SNA. This creates a second set of secret key shares $share_{A,N4}$, $share_{A,N5}$ and $share_{A,N6}$ corresponding to the second verification key $pk_A$ of the second subnetwork SNA. The result of this step is shown in the box 834. As a result, each node of the second set of nodes N4, N5 and N5 holds one of the secret key shares of the second set of key shares $share_{A,N4}$, $share_{A,N5}$ and $share_{A,N6}$.

The secret redistribution protocol may be in particular implemented as follows. The nodes N1, N2 and N3 of the first subnetwork SN0 create shares of their shares $share_{A,N1}$, $share_{A,N2}$ and $share_{A,N3}$ and distribute these shares of their shares to the nodes N4, N5 and N6. Then the nodes N4, N5 and N6 compute from these received shares of the shares $share_{A,N1}$, $share_{A,N2}$ and $share_{A,N3}$ their own individual secret key shares $share_{A,N4}$, $share_{A,N5}$ and $share_{A,N6}$.

Referring back to FIG. 8a, a further step 850 comprises signing, by a subset of the nodes of the first subnetwork, e.g. by the nodes N1, N2 and N3, the verification key $pk_A$ of the second subnetwork SNA with a permissible subset of the secret key shares SNA and a plurality of corresponding secret key shares $share_{0,N1}$, $share_{0,N2}$ and $share_{0,N3}$ of the nodes N1, N2 and N3 of the first subnetwork SN0. This has generated a joint signature $\sigma_{pk0}$ on the verification key $pk_A$ of the second subnetwork.

Figure 2:
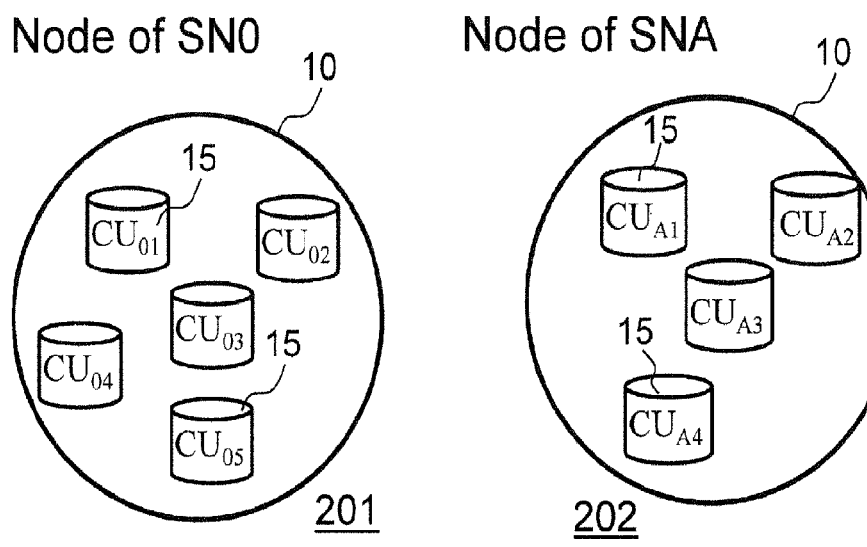
FIG. 2 illustrates in a more detailed way computational units running on an exemplary node of the network.

FIG. 2 illustrates in a more detailed way computational units 15 running on nodes 10 of the network 100. The network 100 is configured to assign each of the computational units which are running on the network 100 to one of the plurality of subnets, in this example to one of the subnets SN0, SNA, SNB or SNC according to a subnet-assignment. The subnet-assignment of the distributed network 100 creates an assigned subset of the whole set of computational units for each of the subnets SN0, SNA, SNB and SNC.

More particularly, FIG. 2 shows on the left side 201 a node 10 of the subnet SN0 of FIG. 1. The subnet assignment of the distributed network 100 has assigned a subset of five computational units 15 to the subnet SN0 more particularly the subset of computational units CU01, CU02, CU03, CU04 and CU05. The assigned subset of computational units CU01, CU02, CU03, CU04 and CU05 runs on each node 10 of the subnet SN0. Furthermore, the assigned subset of computational units is replicated across the whole subnet SN0 such that each of the computational units CU01, CU02, CU03, CU04 and CU05 traverses the same unit states/execution states.

Furthermore, FIG. 2 shows on the right side 202 a node 10 of the subnet SNA of FIG. 1 on which four computational units 15 are run, more particularly the set of computational units $CU_{A1}$, $CU_{A2}$, $CU_{A3}$ and $CU_{A4}$. The set of computational units $CU_{A1}$, $CU_{A2}$, $CU_{A3}$ and $CU_{A4}$ runs on each node 10 of the subnet SNB. Furthermore, the set of computational units is replicated across the whole subnet SNA such that each of the computational units $CU_{A1}$, $CU_{A2}$, $CU_{A3}$ and $CU_{A4}$ has the same unit state7execution state.

Figure 3:
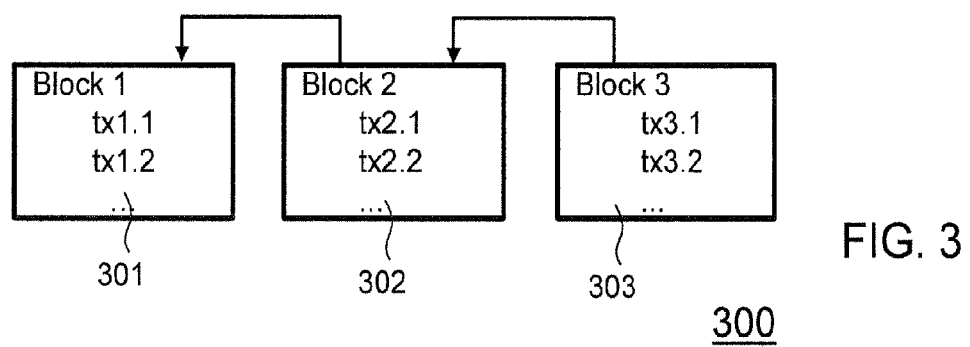
FIG. 3 illustrates the creation of blocks in distributed networks according to embodiments of the invention.

FIG. 3 illustrates the creation of blocks in distributed networks according to embodiments of the invention. The blocks may be in particular input blocks which are to be processed by the computational units of an execution subset. The blocks which are to be processed by the execution subset have been agreed upon by a consensus subset of the respective nodes of the subnet.

In this exemplary embodiment three input blocks 301, 302 and 303 are illustrated. Block 301 comprises a plurality of transactions, namely the transactions tx1.1, tx1.2 and possibly further transactions indicated with dots. Block 302 comprises also a plurality of transactions, namely the transactions tx2.1, tx2.2 and possibly further transactions indicated with dots. Block 303 also comprises a plurality of transactions, namely the transactions tx3.1, tx3.2 and possibly further transactions indicated with dots. The input blocks 301, 302 and 303 are chained together. More particularly, each of the blocks comprises a block hash of the previous block. This cryptographically ties the current block to the previous block(s).

According to embodiments the transactions may be in particular execution messages which are to be executed by the nodes of the execution subset.

According to embodiments, the input blocks 301, 302 and 303 may be created by a proof-of-stake consensus-protocol.

However, it should be noted that the input blocks generated by the consensus component do not need to be chained together according to embodiments. Rather any consensus protocol that reaches some kind of consensus between the nodes on the selection and/or processing order of received messages may be used according to embodiments.

Figure 4:
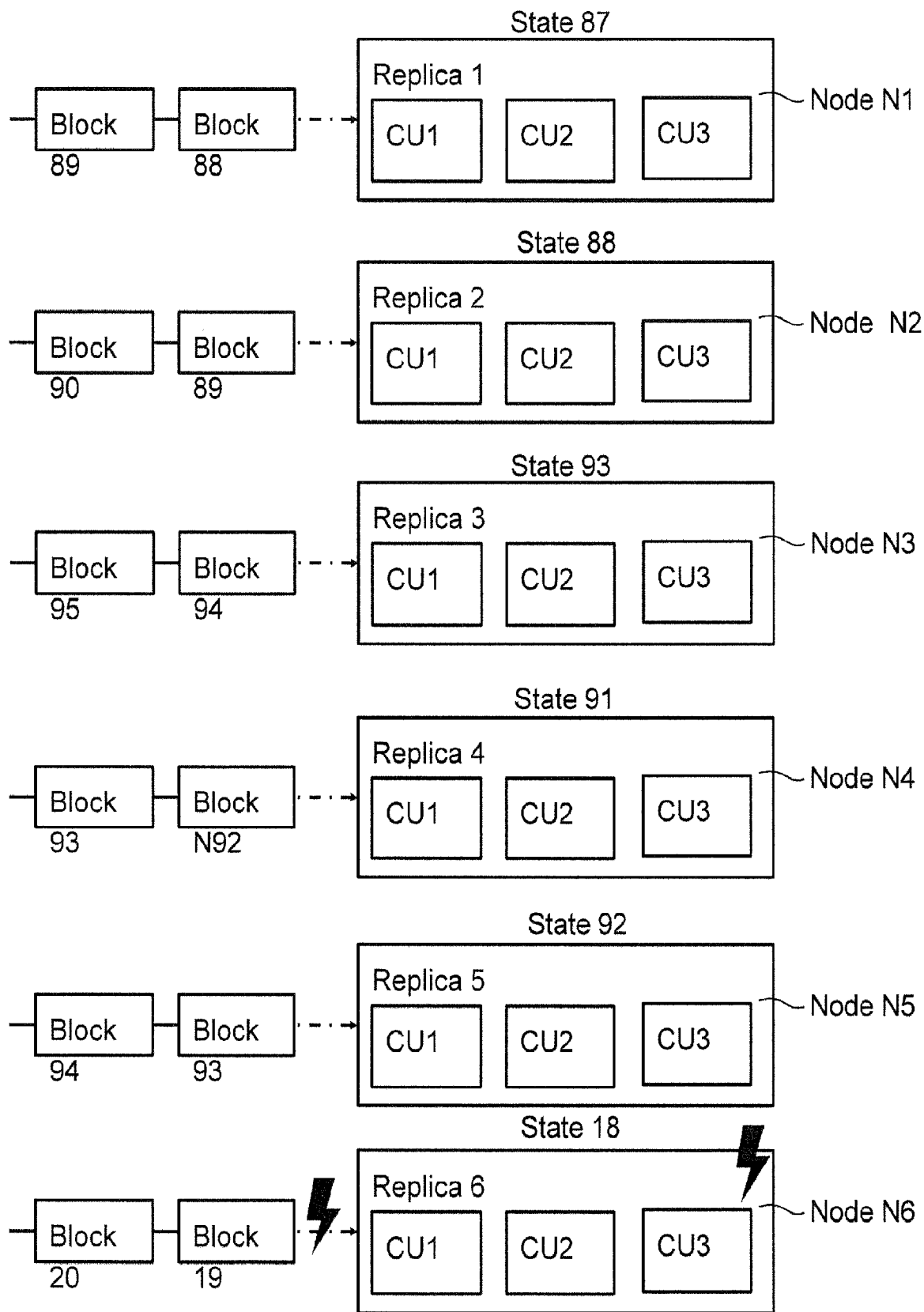
FIG. 4 illustrates a block by block processing of input blocks to be processed by the nodes of an execution subset.

FIG. 4 illustrates in a simplified and schematic way the block by block processing of the input blocks to be processed by the nodes N1-N6 of an execution subset.

Several execution messages may be grouped together to form a block, but the execution messages keep their logical order within a block. Examples of execution messages, which may also be denoted as mutations are as follows:

User U requests execution of method M on computational unit B with arguments X.

Developer V requests installation of computational unit D with initial state S.

Developer V requests upgrade of computational unit D to computational unit D' with a state transition function S→S'

Developer V requests removal of computational unit D.

Each of the nodes N1, N2, N3, N4, N5 and N6 of the execution subset is configured to execute the same chain of input blocks comprising in general the execution messages of the blocks N, N−1, N−2 . . . etc. The numbers of the blocks N, N−1, N−2 may be denoted as the height of the blockchain.

According to this example it is assumed that the execution subset of the nodes of the underlying distributed network, in particular the nodes of a respective subnet, comprise three computational units CU1, CU2 and CU3. Each of the six nodes N1-N6 runs a replica of the three computational units CU1, CU2 and CU3.

As mentioned, each of the six nodes N1-N6 perform the processing of the execution blocks in a deterministic manner, but the processing of the input blocks may be not performed simultaneously, but may be staggered. In other words, the nodes may be at a different height of the blockchain.

After a node has processed or executed an input block of the height N, the node has a corresponding execution state N. In other words, the execution state N of a node corresponds to the result of the execution of the input block N.

In the example of FIG. 4, the node N1 has successfully executed the input block 87, is in the execution state 87 and is adapted to process the input block 88 as next input block.

Furthermore, the node N2 has successfully executed the input block 88, is in the execution state 88 and is adapted to process the input block 89 as next input block.

In a corresponding manner, the node N3 is already in the execution state 93, the node N4 in the execution state 91 and the node N5 in the execution state 92.

The execution states of the nodes N1-N5 are still close together and the nodes that are a bit behind just have to process the remaining input blocks to traverse the execution states.

However, the node N6 is assumed to be a node that has lost track. It may be e.g. a node that has crashed which is illustrated with a lightning. The node N6 has lost track of the execution states and is in the need of a method or way to catch-up to the nodes N1-N5 which are close to the latest execution state. In the following the node N6 may also be denoted as catch-up node 6.

Figure 5:
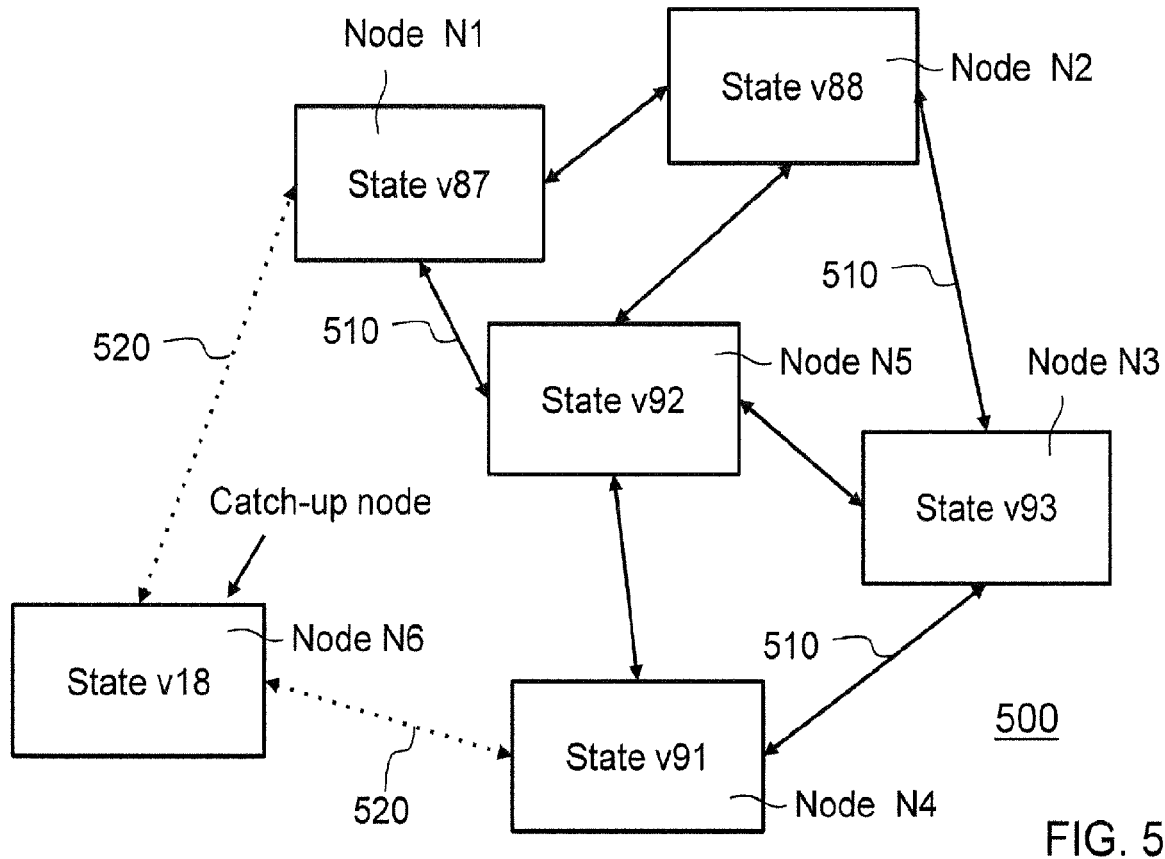
FIG. 5 shows a state diagram of the nodes corresponding to FIG. 4.

FIG. 5 shows a state diagram of the nodes N1-N6 corresponding to FIG. 4. The nodes N1-N6 may communicate with each other via communication links 510 which are illustrated by full arrows. However, the catch-up node N6 is not up-to date anymore and hence has lost its connection to the rest of the nodes N1-N5, which is illustrated by dotted arrows 520.

Embodiments of the invention provide the catch-up node N6 with a set of information or in other words a package of information that facilitates or enables the node N6 to catch-up its execution state with a current execution state of the network. Such a package or set of information is in the following also denoted as state information package or catch-up package. Details on the information that such a state information package may contain will be described further below.

Figure 6:
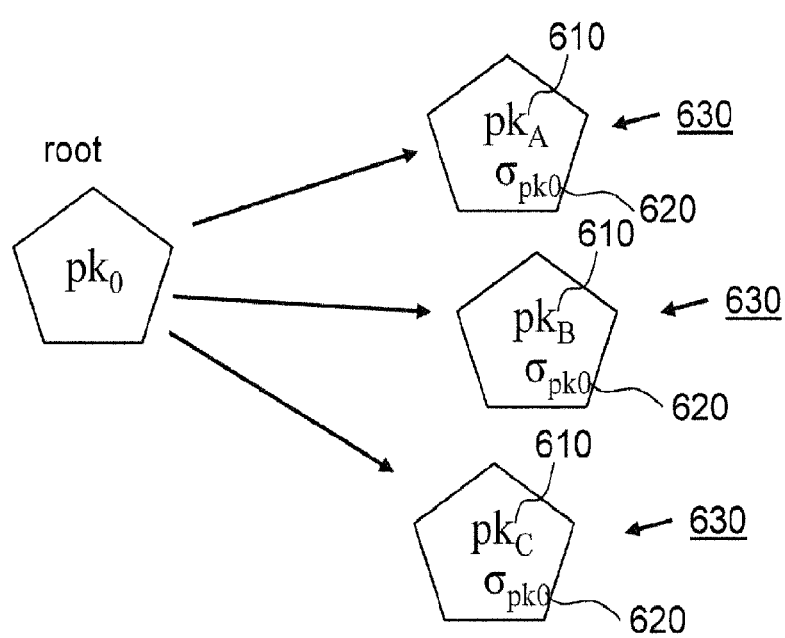
FIG. 6 shows verification keys of subnets which have been certified by a signature of a governance subnet according to an embodiment of the invention.

With reference to FIG. 6, a method according to embodiments of the invention will be explained which allows a catch-up node, e.g. the catch-up node N6, to verify such a state information package.

More particularly, FIG. 6 shows the plurality of second verification keys $pk_A$, $pk_B$ and $pk_C$, of the second subnets SNA, SNB and SNC respectively, commonly referred to as second verification keys 610, which have been certified by a signature $\sigma_{pk0}$ of the first/governance subnet SN0.

Hence all the second verification keys 610 refer back to the verification key $pk_0$ of the first/governance subnet SN0. Accordingly, the verification key $pk_0$ of the first/governance subnet SN0 establishes a root trust of the distributed network.

Each of the public verification keys $pk_A$, $pk_B$ and $pk_C$ is signed by a predefined minimum number of the secret key shares of the governance subnet, i.e. by the secret key shares that correspond to the verification key $pk_0$. The signature that is generated jointly by the predefined minimum number of secret key shares which correspond to a public verification key $pk_1$ forms a joint signature 620 of the involved nodes and is in the following denoted with $\sigma_{pk1}$.

The key that is formed in such a way can be verified with verification key $pk_0$ which establishes a root of trust for the distributed network. The key 610 together with the signature 620 forms a key certificate 630.

In order to allow a verification for the nodes of the network, in particular for catch-up nodes, the network may publish newly generated verification keys of second subnetworks together with the joint signature by the governance committee/governance subnet.

The publication of the verification key certificates 630 can be made in various ways and this depends on the communication mechanisms of the respective distributed network. But generally speaking publication shall be understood as making available to the nodes of the network, in particular to a catch-up node.

The key certificates 630 and the corresponding verification keys may be used according to embodiments of the invention to verify signatures of a state information package.

Figure 7A:
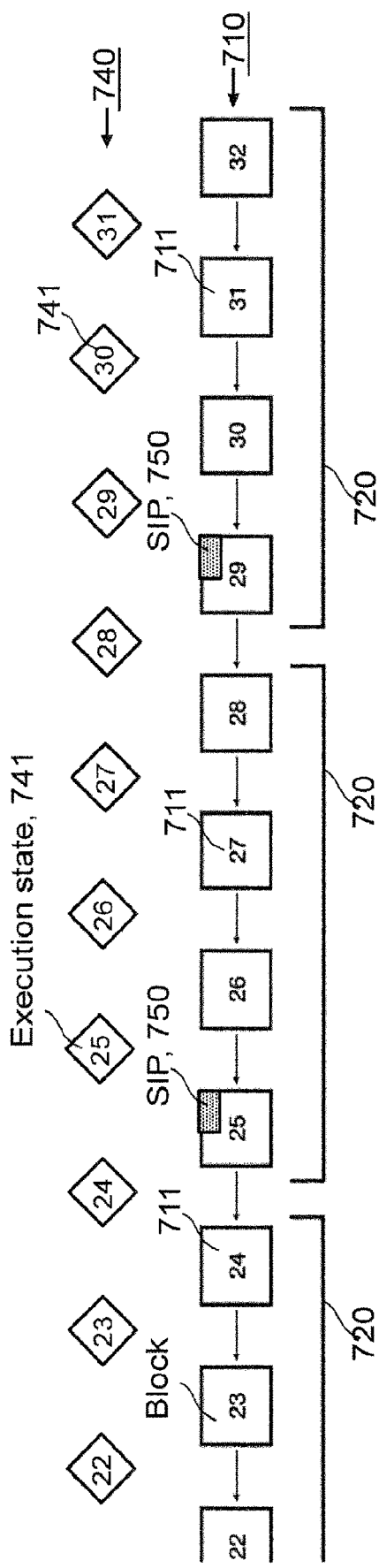
FIG. 7a shows a timing diagram of the creation of state information packages according to embodiments of the invention.

FIG. 7a illustrates a timing diagram of a blockchain 710 comprising blocks 711 with block numbers 22 to 32. According to the illustrated example, a number of 4 blocks establishes predefined intervals 720 of 4 blocks 711 of the blockchain 710. Corresponding to the blockchain 710 the nodes of the distributed network traverse a chain 740 of execution states 22-31. The execution states 22-31 are commonly denoted with reference numeral 741 and furthermore illustrated with a diamond 741. The nodes of the execution subset of the distributed network capture or in other words move to the execution state N after having executed the execution messages of the corresponding block N. As an example, the nodes of the execution subset capture or move to the execution state 24 after having executed the execution messages of the block 24. For this reason, the diamonds 741 which represent the states in FIG. 7a are shown a bit offset to the corresponding blocks 711.

In the example of FIG. 7a, a state information package for the seventh interval comprising the blocks 25-28 may be signed with the secret key shares corresponding to the verification for this subnet. According to embodiments, the state information package may also be denoted as catch-up package or recovery package. The state information package comprises in particular an execution state or a hash of the execution state. The embodiment according to which the state information package comprises only a hash of the execution state has the advantage that the respective node may check first the hash and only download the complete execution state in case of a positive verification of the hash. In such an embodiment the state information package comprises the hash together with all keys and certificates needed to verify it from $pk_0$. This may avoid to download the complete state unnecessarily. In case the verification of the hash is positive, the (complete) execution state itself may be fetched separately.

The execution state may be in particular a recent execution state, in particular an execution state of the current interval. As an example, referring to FIG. 7a, the secret key shares corresponding to the respective verification key $pk_X$ of the respective subnet may sign a state information package SIP, 750 that comprises state information of the execution state 24 which corresponds to the execution state after the execution of the block 24.

According to embodiments, the state information package SIP, 750 may be added to a block of the blockchain. According to embodiments, each first block of the intervals 720 comprises a state information package SIP, 750.

Figure 7B:
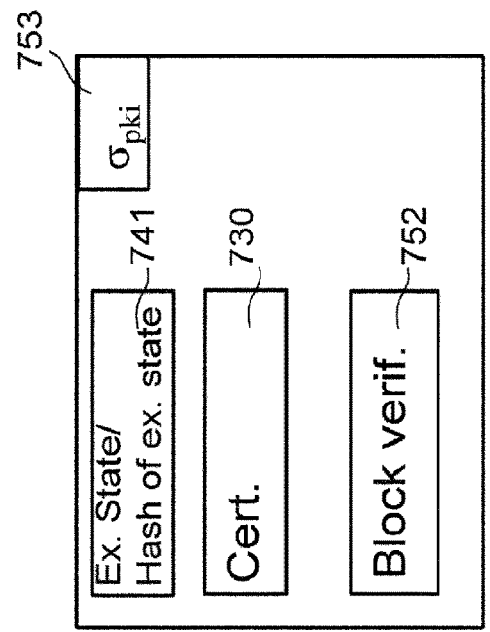
FIG. 7b shows a block diagram of a state information package.

FIG. 7b shows a more detailed block diagram of the state information packages SIP, 750. The state information packages 750 comprise at first an execution state 741.

In addition, the state information packages 750 comprise a certificate 730 which may correspond to the certificate 630 as shown in FIG. 6

Furthermore, the state information package 750 comprises block verification information 752. Such block verification information 752 may comprise in particular the information which is needed to verify subsequent blocks of the blockchain, in particular the validity of subsequent blocks. In this respect, subsequent blocks are the blocks that are to be executed subsequent to the execution state of the state information package. The block verification information may comprise in particular a set of verification keys which are required to verify the validity of blocks of the blockchain.

The complete state information package 750 is signed with a joint signature $\sigma_{pkX}$ by the predefined minimum number of secret key shares which correspond to the verification key $Pk_X$ of the respective subnet.

The certificate 730 comprises the verification key needed to verify $pk_X$. After verification of $pk_X$ with the verification key certificate, a respective node can verify the signature $\sigma_{pkX}$ on the state information package 750 with the verified verification key $pk_X$.

It should be noted that the certificate 730 may not need to be included in the state information package 750 according to embodiments, but it may also be communicated to a respective catch-up node via another communication channel.

Figure 9:
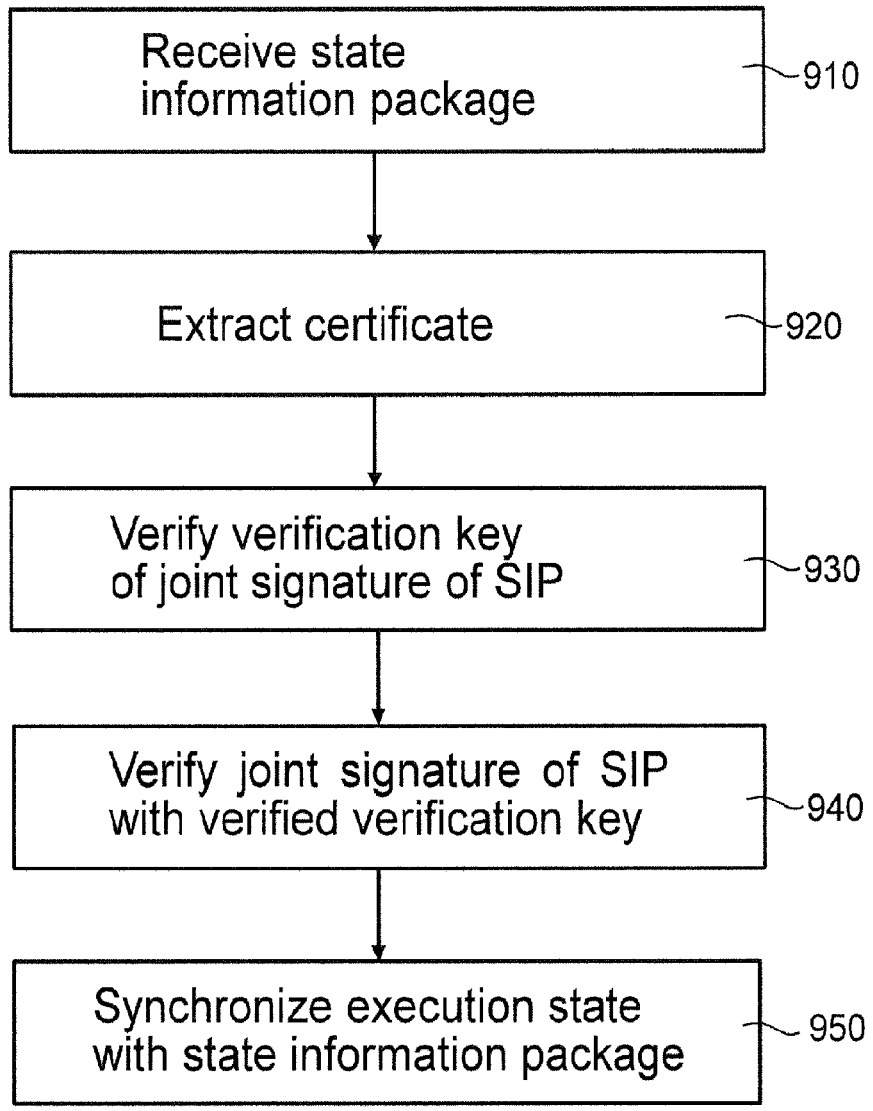
FIG. 9 shows a flow chart of methods steps illustrating how a catch-up node can update its execution state.

FIG. 9 shows a flow chart 900 of the method's steps illustrating how a catch-up node can update its execution state.

At a step 910, the catch-up node receives a state information package, e.g. the state information package 750 as shown in FIG. 7b. The catch-up node may extract the state information package e.g. from a block that contains a state information package.

Then, the catch-up node verifies the received state information package in a two-step approach.

At first, the catch-up node extracts at a step 920 the certificate from the state information package. Furthermore, it uses, at a step 930, the certificate to verify the verification key which corresponds to the joint signature of the state information package.

The steps 920 and 930 form a first part or first step of the verification of the state information package.

Next, at a step 940, the catch-up node verifies the joint signature on the state information package with the verification key that had been verified before at the steps 920 and 930.

After a successful verification, the catch-up node can synchronize at a step 950 its execution state by means of the further elements of the state information package, in particular by means of the execution state 741 provided by the state information package.

Figure 10:
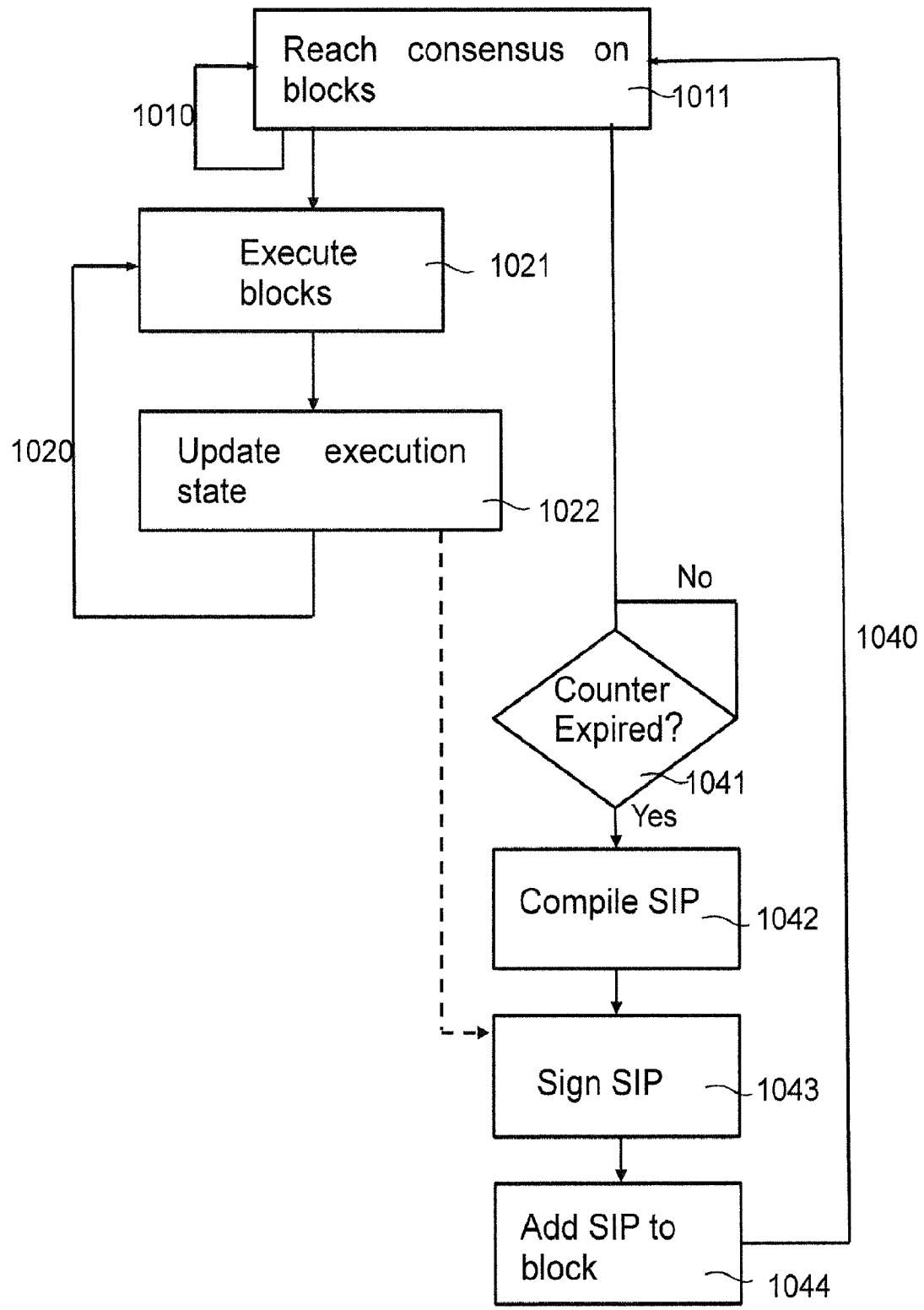
FIG. 10 shows a flow chart of a method aspects of embodiments of the invention.

FIG. 10 shows a flow chart of a method aspects of embodiments of the invention, more particularly a method for regularly adding a state information package to blocks of a distributed network and associated protocols.

The method performs regularly at loops 1010 a consensus protocol to reach a consensus on a set of execution messages that shall be executed by an execution subset of the nodes, in particular by a subnetwork. The consensus protocol may be performed by a consensus subset of the nodes of the network, in particular by a consensus subset of a subnet. The loop 1010 comprises a step 1011 at which the nodes of the consensus subset reach a consensus on a new input block. The input blocks may be numbered with an increasing height index N. N is an increasing integer, i.e. e.g. 0, 1, 2, 3 . . . N. The height index may also be denoted as block height.

The execution messages of the input blocks that have been agreed upon are then individually executed, at steps 1021, by the computational units of the nodes of the execution subset in a deterministic manner.

As a result of the execution, the nodes of the execution subset update their execution state, at steps 1022, and traverse thereby a chain of execution states. As explained above, the different nodes of the execution subset may operate at different positions of the chain at a certain point in time. The steps 1021 and 1022 are repeated in loops 1020.

Furthermore, the method comprises loops 1040 for generating and signing a state information package SIP. The state information package SIP is not generated for every block, but only at every $i^{th}$ block, e.g. at every 500th block. This may be implemented e.g. with a counter. Accordingly, after the generation of each block, at steps 941, a counter is triggered and it is checked whether the counter has expired. The counter may be embodied in various ways. In particular, it may be programmed to expire after a predefined number of processing loops 1010, e.g. after 500 processing loops 1010.

If the counter has expired, the nodes compile, at steps 1042, a state information package SIP which may comprise the information as explained above, in particular a recent execution state. Then, at a step 1043, the state information package of the current interval or loop is signed with a predefined minimum number of secret key shares corresponding to the verification key of the respective subnetwork.

Next, at a step 1044, the state information package SIP is added to a block of the blockchain and the counter is reset.

FIG. 11 shows an example of execution state information 1100 of an execution state "state@5000".

The execution state is provided as tree-structured data. Such an execution state may have a total size of multiple Gigabytes. For an efficient storage on disk it may comprise e.g. 64 Kbytes memory pages.

The execution state state@5000 comprises execution state information of the computational units as well as system metadata. The execution state information of the computational units comprises computational results of the computation of execution messages. The execution state information may be stored as memory pages. The system metadata may include other state maintained by the system on behalf of the computational units and context and callbacks for outstanding messages. According to embodiments the leaves of the tree-structured data may comprise only the hashes of the corresponding data, e.g. of the respective memory page.

According to an embodiment, the execution state may be provided as a Merkle-tree structure. According to embodiments, the state information package may store as execution state information only the hash root of the tree structure, in particular of the Merkle-tree structure. This facilitates a memory-efficient storage.

The tree-structure facilitates an efficient synchronization between a node that is up-to-date and a catch-up node that is outdated and wants to resume participation in the distributed network.

FIG. 12 illustrates such a synchronization between an up-to-date node 1210 that has an execution state state@5000 and an outdated catch-up node 1220 that has an outdated state state@4000.

According to an embodiment, the catch-up node 1220 may request from the up-to-date node 1210 only the leaf hashes of the tree-structure and compare the leaf hashes of its own state with the leaf hashes of the up-to-date node. In a further step, the catch-up node 1220 may request then from the up-to-date node 1210 only the state information which corresponds to leaves with different leaf hashes. This avoids to download a complete state information package, but only the part of the state information package that is different from the state of the catch-up node.

Figure 13A:
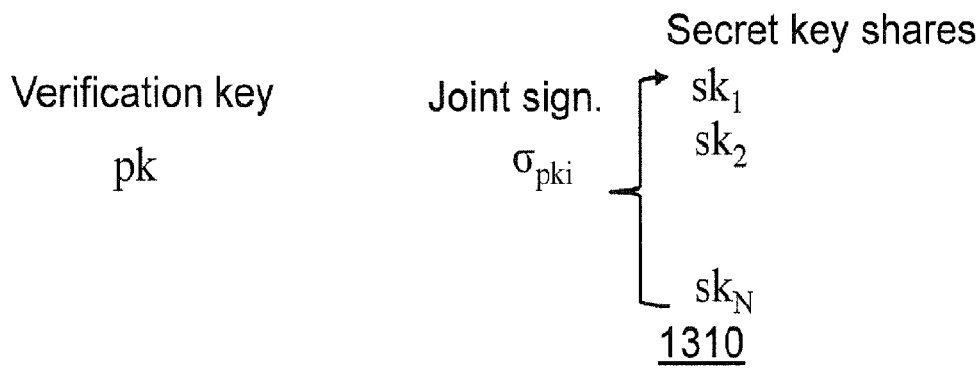
FIG. 13a shows an embodiment of keys which are generated by a distributed threshold key generation protocol.
Figure 13B:
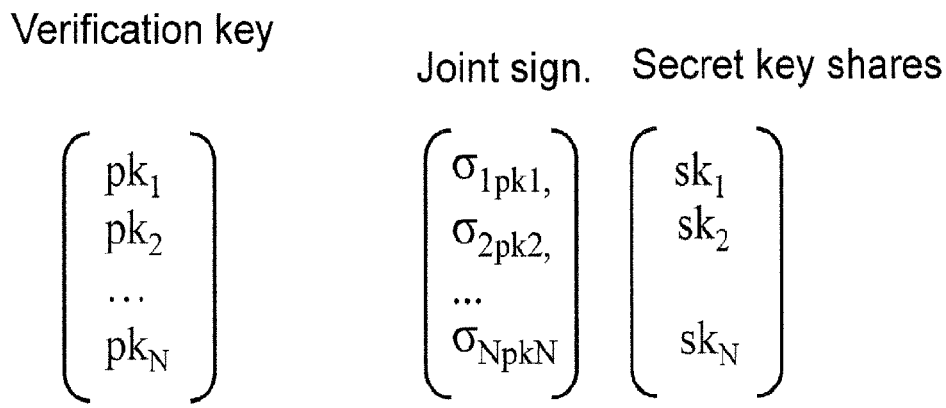
FIG. 13b shows an embodiment of keys which are generated by a multi-signature protocol.

FIG. 13a and FIG. 13b illustrate embodiments of the verification keys and its corresponding secret key shares obtained from the governance committee subnet according to embodiments of the invention.

FIG. 13a shows an embodiment of keys 1310 which are generated by a distributed threshold key generation protocol.

It is assumed for this example that a number N of nodes participate in the distributed key generation protocol. For each of the rounds of the distributed key generation protocol each of the N nodes have a secret key share $sk_i$, wherein i=1, . . . , N. The N nodes generate jointly a common public key pk, wherein a predefined threshold, e.g. at least two thirds or a third of the nodes need to agree on a new public key/new verification key and jointly sign the new public key/verification key to generate a threshold signature $\sigma_{pk}$.

FIG. 13b shows an embodiment of keys 1320 which are generated by a multi-signature protocol.

It is again assumed for this example that a number N of nodes participate in the distributed key generation protocol.

For each of the rounds of the distributed key generation protocol each of the N nodes have a secret key share $sk_i$, wherein i=1, ..., N.

According to this embodiment, the secret key shares may be embodied as independent secret keys $sk_i$. The N nodes agree jointly on a common public key/common verification key $\vec{pk}$, which is embodied as a vector. Again, a predefined threshold, e.g. at least two thirds of the nodes or a third of the nodes need to provide a signature on the new public key/verification key $\vec{pk}$ with its secret keys (key shares). According to this embodiment the N nodes execute individual signatures $\sigma_{1pk1}, \sigma_{2pk2}, \ldots, \sigma_{NpkN}$ on the corresponding elements of the vector verification key $\vec{pk}$ with their individual secret keys $sk_i, sk_2, \ldots, sk_N$. More particularly, each of the individual signatures $\sigma_{1pk1}$ have a corresponding individual public key $pk_i$. Hence according to such an embodiment the verification key is embodied as vector $\vec{pk}=(pk_1, pk_2, \ldots pk_N)$ of individual public keys $pk_i$ and the joint signature is embodied as a vector $\vec{\sigma_{pk}}=(\sigma_{1pk1}, \sigma_{2pk2}, \ldots, \sigma_{NpkN})$ as well.

According to other embodiments, also an aggregated signature scheme may be used.

In the following, some more details of distributed key generation protocols which may be used according to embodiments of the invention are given . . . .

Figure 14:
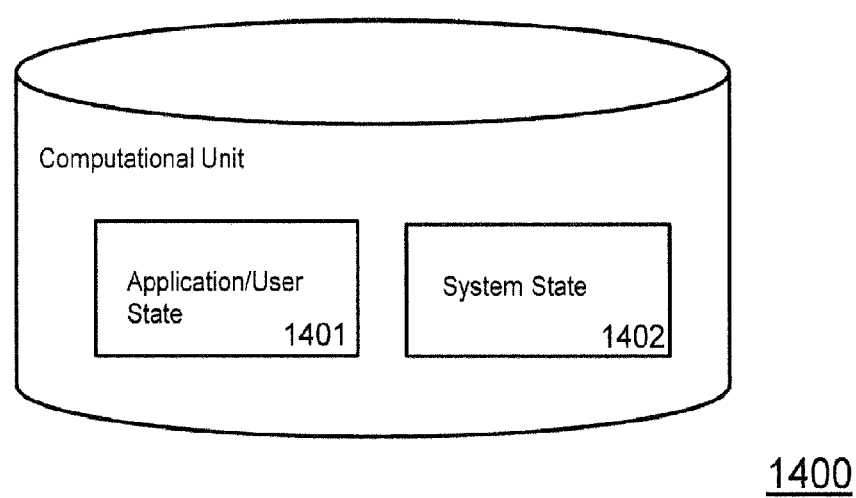
FIG. 14 shows a more detailed illustration of a computational unit according to an embodiment of the invention.

FIG. 14 shows a more detailed illustration of a computational unit 1400 according to an embodiment of the invention.

The computational unit 1400 comprises an user or application state 1401 and a system state 1402.

The user state 1401 consists of a main Web Assembly (WASM) module which implements the functionality of the computational unit and its dependent modules, together with an instance of each of the modules. A WASM module instance consists of memories, global variables and tables.

The system state 1402 cannot be freely modified by code of the computational unit. It includes metadata, other state maintained by the system on behalf of the computational units, notably the compiled form of the WASM modules, and context and callbacks for outstanding messages.

Figure 15:
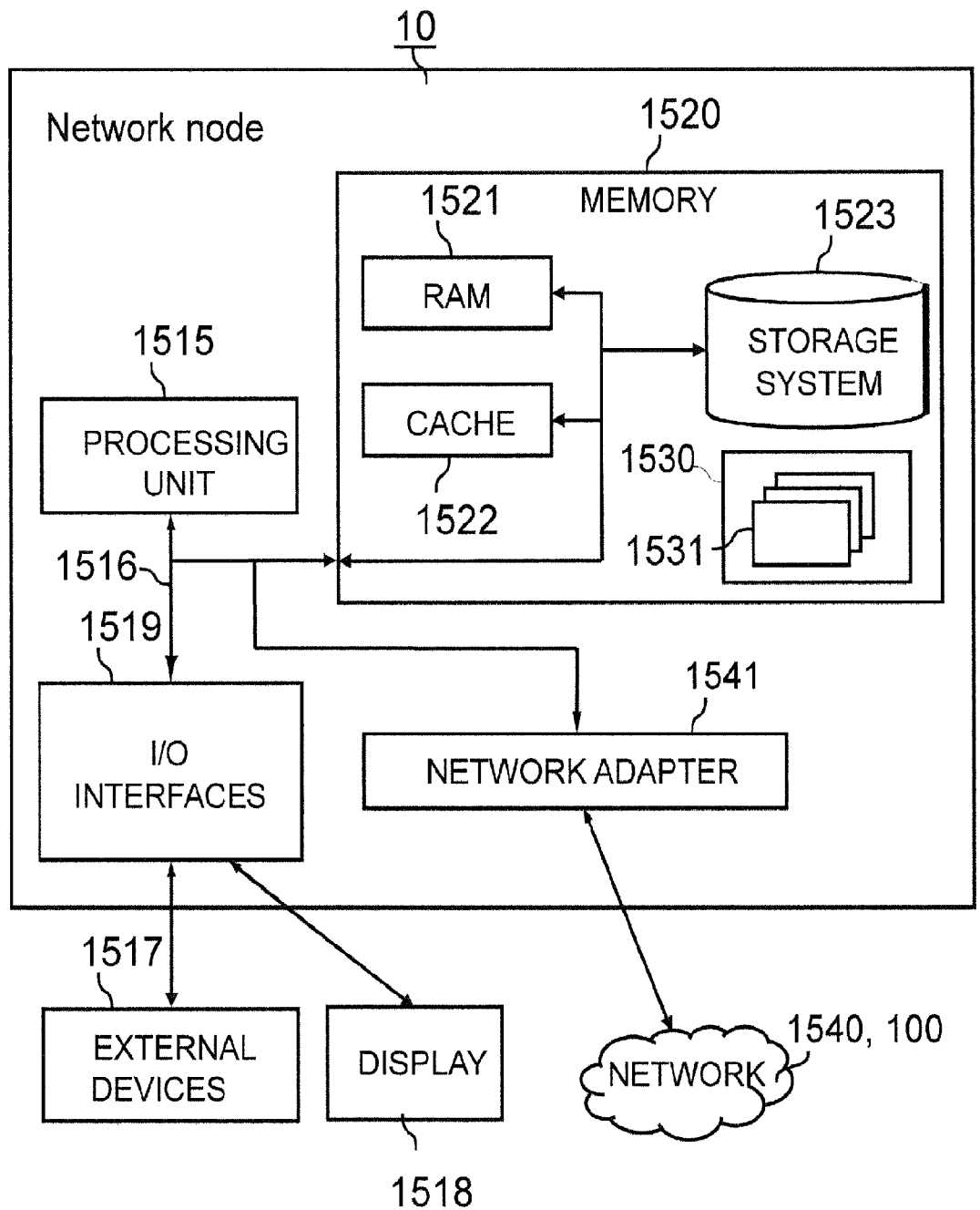
FIG. 15 shows an exemplary embodiment of a node according to an embodiment of the invention.

Referring now to FIG. 15, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be configured to perform a computer-implemented method for providing a user of a distributed network access to computational results computed by the distributed network. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 1515, a system memory 1520, and a bus 1516 that couples various system components including system memory 1520 to processor 1515.

Bus 1516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network node 10 typically includes a variety of computer system readable media. Such media may be any available media that is accessible by network node 10, and it includes both volatile and non-volatile media, removable and non-removable media.

System memory 1520 can include computer system readable media in the form of volatile memory, such as random access memory (RAM) 1521 and/or cache memory 1522. Network node 1510 may further include other removable/non-removable, volatile/non-volatile computer system storage media. By way of example only, storage system 1523 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1516 by one or more data media interfaces. As will be further depicted and described below, memory 1520 may include at least one computer program product having a set (e.g., at least one) of program modules that are configured to carry out the functions of embodiments of the invention.

Program/utility 1530, having a set (at least one) of program modules 1531, may be stored in memory 1520 by way of example, and not limitation, as well as an operating system, one or more application programs, other program modules, and program data. Each of the operating system, one or more application programs, other program modules, and program data or some combination thereof, may include an implementation of a networking environment. Program modules 1531 generally carry out the functions and/or methodologies of embodiments of the invention as described herein. Program modules 1531 may carry out in particular one or more steps of a computer-implemented method for providing a user of a distributed network access to computational results computed by the distributed network, e.g. of one or more steps of the methods as described above.

Network node 10 may also communicate with one or more external devices 1517 such as a keyboard or a pointing device as well as a display 1518. Such communication can occur via Input/Output (I/O) interfaces 1519. Still yet, network node 10 can communicate with one or more networks 40 such as a local area network (LAN), a general wide area network (WAN), and/or a public network (e.g., the Internet) via network adapter 1541. According to embodiments the network 1540 may be in particular a distributed network comprising a plurality of network nodes 10, e.g. the network 100 as shown in FIG. 1. As depicted, network adapter 1541 communicates with the other components of network node 10 via bus 1516. It should be understood that although not shown, other hardware and/or software components could be used in conjunction with network node 10.

Aspects of the present invention may be embodied as a system, in particular a distributed network comprising a plurality of subnets, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While there are shown and described presently preferred embodiments of the invention, it is to be distinctly understood that the invention is not limited thereto but may be otherwise variously embodied and practiced within the scope of the following claims.

The invention claimed is:

1. A computer-implemented method for generating verification keys of a public-key signature scheme in a distributed network, the distributed network comprising a plurality of nodes, the plurality of nodes being subdivided into two or more subnetworks,
   executing computations, at each of the two or more subnetworks, in a deterministic and replicated manner across a respective subnetwork of the two or more subnetworks, thereby traversing for each of the two or more subnetworks a respective separate chain of execution states;
   performing, by a subset of the nodes of a first subnetwork of nodes, a first distributed key generation protocol, the first distributed key generation protocol being configured to generate jointly a verification key for the first subnetwork and a plurality of corresponding secret key shares for a subset of the nodes of the first subnetwork;
   performing, for a second subnetwork, by a subset of the plurality of nodes of the first subnetwork, a second distributed key generation protocol, the second distributed key generation protocol being configured to generate jointly a verification key of the second subnetwork and a plurality of corresponding secret key shares for a subset of the nodes of the second subnetwork; and
   signing, by a subset of the nodes of the first subnetwork, the verification key of the second subnetwork with a permissible subset of the secret key shares of the nodes of the first subnetwork, thereby generating a joint signature on the verification key of the second subnetwork.

2. A computer-implemented method according to claim 1, further comprising
   signing, by the second subnetwork, a state information package of the second subnetwork with a permissible subset of secret key shares corresponding to the verification key of the second subnetwork, thereby generating a joint signature on the state information package of the second subnetwork, the state information package comprising an execution state or a hash of an execution state of the second subnetwork.

3. A computer-implemented method according to claim 2, wherein the state information package provides the execution state as a Merkle-tree structure.

4. A computer-implemented method according to claim 3, further comprising
requesting, by a catch-up node that wants to connect or reconnect to the second subnetwork from an up-to-date node of the second subnetwork, leaf hashes of the Merkle-tree structure;
comparing, by the catch-up node, the leaf hashes of its own state with the leaf hashes of the up-to-date node; and
requesting, by the catch-up node from the up-to-date node, only the state information corresponding to leaves with different leaf hashes.

5. A computer-implemented method according to claim 1, further comprising
signing, by the first subnetwork, a state information package of the first subnetwork with a permissible subset of secret key shares corresponding to the verification key of the first subnetwork, thereby generating a joint signature on the state information package of the first subnetwork, the state information package comprising an execution state or a hash of an execution state of the first subnetwork.

6. A computer-implemented method according to claim 5, wherein the distributed network comprises a plurality of second subnetworks, wherein the state information package of the first subnetwork comprises a list comprising
the node verification keys of the plurality of second subnetworks; and
the plurality of nodes of the plurality of second subnetworks.

7. A computer-implemented method according to claim 1, wherein the performing of the second distributed key generation protocol for the second subnetwork comprises
generating, by the nodes of the first subnetwork, the second verification key and a first set of corresponding secret key shares for the nodes of the first subnetwork; wherein each node of the first subnetwork holds one secret key share of the first set of secret key shares;
redistributing, by a secret-redistribution protocol, the secret key shares of the first set of secret key shares to the nodes of the second subnetwork, thereby creating a second set of secret key shares corresponding to the second verification key of the second subnetwork.

8. A computer-implemented method according to claim 7, wherein the secret-redistribution protocol is a threshold key redistribution protocol.

9. A computer-implemented method according to claim 1, further comprising
publishing the verification key of the second subnetwork together with the joint signature of the first subnetwork, thereby providing a certificate of the verification key of the second subnetwork; and
verifying, by a node, the state information package by
verifying the verification key of the second subnetwork corresponding to the joint signature of the state information package by verifying the certificate with the verification key of the first subnetwork; and
verifying the joint signature on the state information package with the verified verification key of the second subnetwork corresponding to the joint signature of the state information package.

10. A computer-implemented method according to claim 1, further comprising
generating, by the distributed network, a blockchain of blocks; wherein the state information package comprises block verification information for verifying subsequent blocks of the blockchain, and wherein the block verification information comprises a set of verification keys which are required to verify the validity of blocks of the blockchain.

11. A computer-implemented method according to claim 6, wherein the state information package of the second subnetwork comprises the verification key of the second subnetwork and the certificate.

12. A computer-implemented method according to claim 10, further comprising
adding, at predefined intervals, the state information package to a block of the blockchain.

13. A computer-implemented method according to claim 1, wherein the state information package further comprises key generation information of the distributed key generation protocol that was used to generate the verification key of the second subnetwork.

14. A computer-implemented method according to claim 1, wherein the state information package comprises a complete set of information which allows to synchronize the execution state of a catch-up node that wants to connect or reconnect to the distributed network with a recent execution state.

15. A computer-implemented method according to claim 1, wherein the distributed key generation protocol is a distributed threshold key generation protocol.

16. A computer-implemented method according to claim 1, wherein the joint signature is a multi-signature.

17. A computer-implemented method according to claim 1, wherein the distributed key generation protocol comprises
accepting, by a catch-up node, one or more connections from unknown nodes;
limit the communication exchange with the unknown nodes to the communication concerning the state information package and the certificate; and
stop the communication with the unknown nodes once the state information package and the certificate have been received.

18. A distributed network system comprising a plurality of nodes, wherein each of the plurality of nodes is configured to run one or more computational units, wherein the computational units of each of the two or more subnetworks are configured to
execute, at each of the two or more subnetworks, in a deterministic and replicated manner across a respective subnetwork of the two or more subnetworks, thereby traversing for each of the two or more subnetworks a respective separate chain of execution states;
perform, by a subset of the nodes of a first subnetwork of nodes, a first distributed key generation protocol, the first distributed key generation protocol being configured to generate jointly a verification key for the first subnetwork and a plurality of corresponding secret key shares for a subset of the nodes of the first subnetwork;
perform, for a second subnetwork, by a subset of the plurality of nodes of the first subnetwork, a second distributed key generation protocol, the second distributed key generation protocol being configured to generate jointly a verification key of the second subnetwork and a plurality of corresponding secret key shares for a subset of the nodes of the second subnetwork; and sign, by a subset of the nodes of the first subnetwork, the verification key of the second subnetwork with a permissible subset of the secret key shares of the nodes of the first subnetwork, thereby generating a joint signature on the verification key of the second subnetwork.

19. A node for a distributed network according to claim 18, the node being configured to
   participate in a first distributed key generation protocol, the first distributed key generation protocol being configured to generate jointly a verification key for the first subnetwork and a plurality of corresponding secret key shares for a subset of the nodes of the first subnetwork;
   participate in a second distributed key generation protocol, the second distributed key generation protocol being configured to generate jointly a verification key of the second subnetwork and a plurality of corresponding secret key shares for a subset of the nodes of the second subnetwork; and
   participate in a joint signature of the verification key of the second subnetwork comprising a permissible subset of the secret key shares of the nodes of the first subnetwork.

20. A computer program product embodied in a non-transitory computer readable storage medium having program instructions executed by one or more of a plurality of nodes of a distributed network being subdivided into two or more subnetworks to cause the one or more of the plurality of nodes to perform functions comprising:
   executing computations, at each of the two or more subnetworks, in a deterministic and replicated manner across a respective subnetwork of the two or more subnetworks of the plurality of nodes, thereby traversing for each of the two or more subnetworks a respective separate chain of execution states;
   performing, by a subset of the nodes of a first subnetwork of nodes, a first distributed key generation protocol, the first distributed key generation protocol being configured to generate jointly a verification key for the first subnetwork and a plurality of corresponding secret key shares for a subset of the nodes of the first subnetwork;
   performing, for a second subnetwork, by a subset of the plurality of nodes of the first subnetwork, a second distributed key generation protocol, the second distributed key generation protocol being configured to generate jointly a verification key of the second subnetwork and a plurality of corresponding secret key shares for a subset of the nodes of the second subnetwork; and
   signing, by a subset of the nodes of the first subnetwork, the verification key of the second subnetwork with a permissible subset of the secret key shares of the nodes of the first subnetwork, thereby generating a joint signature on the verification key of the second subnetwork.

* * * * *